(12) United States Patent
Ashizawa et al.

(10) Patent No.: US 7,514,845 B2
(45) Date of Patent: Apr. 7, 2009

(54) VIBRATIONAL ACTUATOR AND METHOD FOR DRIVING VIBRATIONAL ACTUATOR

(75) Inventors: Takatoshi Ashizawa, Yokohama (JP); Mine Sumitomo, Chuo-ku (JP); Mina Kobayashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 92 days.

(21) Appl. No.: 11/441,230

(22) Filed: May 26, 2006

(65) Prior Publication Data

US 2006/0267454 A1 Nov. 30, 2006

(30) Foreign Application Priority Data

| May 26, 2005 | (JP) | ............................. 2005-153784 |
| May 27, 2005 | (JP) | ............................. 2005-155782 |
| May 30, 2005 | (JP) | ............................. 2005-157244 |

(51) Int. Cl.
*H01L 41/08* (2006.01)

(52) U.S. Cl. ............................. 310/323.12; 310/323.02; 310/323.16

(58) Field of Classification Search ............ 310/323.02, 310/323.12, 323, 16, 323.03
See application file for complete search history.

(56) References Cited

U.S. PATENT DOCUMENTS

| 5,103,128 A * | 4/1992 | Adachi .................. 310/323.03 |
| 5,164,629 A * | 11/1992 | Nakanishi .............. 310/323.03 |
| 5,225,734 A * | 7/1993 | Nakanishi .............. 310/323.03 |
| 5,438,229 A | 8/1995 | Ohtsuchi et al. |
| 5,557,157 A | 9/1996 | Shirasaki |
| 5,610,468 A | 3/1997 | Miyazawa et al. |
| 5,917,269 A * | 6/1999 | Maruyama et al. ...... 310/323.03 |
| 6,225,730 B1 * | 5/2001 | Fujimoto ..................... 310/348 |
| 6,943,481 B2 * | 9/2005 | Okamoto et al. ....... 310/323.06 |
| 6,952,073 B2 * | 10/2005 | Yamamoto ............. 310/323.06 |

FOREIGN PATENT DOCUMENTS

| JP | A 59-96881 | 6/1984 |
| JP | A 61-224884 | 10/1986 |
| JP | H1-017354 | 3/1989 |
| JP | A 2001-57787 | 2/2001 |
| JP | A 2003-169486 | 6/2003 |

* cited by examiner

*Primary Examiner*—Mark Budd
(74) *Attorney, Agent, or Firm*—Oliff & Berridge, PLC

(57) ABSTRACT

A vibrational actuator includes an oscillator that generates vibrational energy; a mover that is rotationally driven around a first axis by the vibrational energy; an output shaft that rotates around a second axis by using a rotational force communicated from the mover; and a flange portion projecting out from the output shaft along a direction intersecting the second axis, that rotates together with the output shaft. Pressure is applied to the mover at a position between the flange portion and the oscillator. A distance from the first axis to an outer portion of the mover over an area where the mover is pressed against the flange portion is set to a value large enough to prevent the first axis and the second axis from becoming tilted relative to each other.

42 Claims, 14 Drawing Sheets

FIG. 3

| RADIUS CORRESPONDING TO OUTER DIAMETER OF CONTACT SURFACE r (mm) | RADIUS CORRESPONDING TO OUTER DIAMETER OF SLIDING SURFACE R (mm) | r/R | NOISE GENERATION |
|---|---|---|---|
| 3.0 | 11.0 | 0.27 | × |
| 5.5 | 11.0 | 0.50 | ○ |
| 7.0 | 11.0 | 0.64 | ○ |
| 9.0 | 11.0 | 0.82 | ○ |

○: NO NOISE
×: NOISE

FIG. 11

| TEMPER-ATURE [°C] | SAMPLE 1 | SAMPLE 2 | SAMPLE 3 | SAMPLE 4 | SAMPLE 5 | SAMPLE 6 | SAMPLE 7 | SAMPLE 8 |
|---|---|---|---|---|---|---|---|---|
| | EPDM | EPDM | EPDM | EPDM | EPDM | EPDM | IIR | IIR |
| | SHORE HARDNESS 10 | SHORE HARDNESS 20 | SHORE HARDNESS 30 | SHORE HARDNESS 40 | SHORE HARDNESS 50 | SHORE HARDNESS 60 | SHORE HARDNESS 40 | SHORE HARDNESS 60 |
| 60 | ○ | ○ | ○ | ○ | ○ | ○ | ○ | ○ |
| 20 | ○ | ○ | ○ | ○ | ○ | ○ | △ | △ |
| 0 | ○ | ○ | ○ | ○ | ○ | △ | × | × |
| −20 | ○ | ○ | ○ | ○ | ○ | × | × | × |

○ : NO NOISE
△ : OCCASIONAL NOISE
× : NOISE

FIG. 12

| COMPRESSIBILITY (SURFACE PRESSURE/MODULUS OF COMPRESSIVE ELASTICITY) | NOISE |
|---|---|
| 0.001 | △ |
| 0.002 | ○ |
| 0.004 | ○ |
| 0.005 | ○ |
| 0.02 | ○ |
| 0.03 | ○ |
| 0.05 | ○ |
| 0.06 | ○ |
| 0.1 | ○ |
| 0.15 | ○ |
| 0.25 | ○ |
| 0.4 | △ |

○ : NO NOISE
△ : OCCASIONAL NOISE
× : NOISE

VIBRATIONAL ACTUATOR AND METHOD FOR DRIVING VIBRATIONAL ACTUATOR

INCORPORATION BY REFERENCE

The disclosures of the following priority applications are herein incorporated by reference:
Japanese Patent Application No. 2005-153784 filed May 26, 2005
Japanese Patent Application No. 2005-155782 filed May 27, 2005
Japanese Patent Application No. 2005-157244 filed May 30, 2005

BACKGROUND OF THE INVENTION

1. Field of the Invention

The present invention relates to a vibrational actuator. More specifically, it relates to a vibrational actuator that generates vibrational energy by causing vibration of an elastic body and obtains a drive force by extracting this vibrational energy as an output.

2. Description of Related Art

Japanese Laid Open Patent Publication No. S59-96881 discloses a vibration wave motor that generates a progressive vibration wave (hereafter referred to as a progressive wave) at a drive surface of an elastic body as a piezoelectric member expands/contracts. At the drive surface, an elliptical motion attributable to the progressive wave occurs and a mover that becomes pressed in contact with the wave front of the elliptical motion is thus driven. By mounting such a vibration wave motor, which retains a high torque even at a low rotation rate in a certain type of drive device, the need for gears at the drive device may be eliminated. Thus, advantages such as elimination of gear noise and an improvement in the positioning accuracy are achieved.

If the diameter of a vibration wave motor is reduced for purposes of miniaturization, the torque generated thereat (torque=tangential force×diameter) becomes smaller, resulting in a smaller output (output=torque×rotation speed) of the vibration wave motor. This means that the rotation speed of a more compact vibration wave motor with lower torque needs to be raised. However, such an increase in the rotation speed may lead to a problem of abnormal noise.

SUMMARY OF THE INVENTION

A vibrational actuator according to a first aspect of the disclosure includes an oscillator that generates vibrational energy; a mover that is rotationally driven around a first axis by the vibrational energy; an output shaft that rotates around a second axis by using a rotational force communicated from the mover; and a flange portion projecting out from the output shaft along a direction intersecting the second axis, that rotates together with the output shaft, wherein pressure is applied to the mover at a position between the flange portion and the oscillator; and a distance from the first axis to an outer portion of the mover over an area where the mover is pressed against the flange portion is set to a value large enough to prevent the first axis and the second axis from becoming tilted relative to each other.

When r represents the distance from the first axis to the outer portion of the mover over the area where the mover is pressed against the flange portion and R represents a distance from the first axis to an outer portion of the mover over an area where the mover is pressed against the oscillator, a relationship expressed as $r/R \geq 0.5$ may be satisfied.

It is preferable that the output shaft and the mover assure a level of freedom that allows the output shaft and the mover to rock relative to each other within a predetermined angle range with regard to an angle formed by the first axis and the second axis. The flange portion may be capable of moving relative to the output shaft. A regulating member may be further provided that regulates positions of the flange portion and the output shaft relative to each other along a direction in which the pressure is applied to the mover. The regulating member may be a retaining ring fitted inside a groove formed at the output shaft.

It is preferable that the mover includes a through hole in which the output shaft is at least partially fitted. The output shaft may include a fitting portion that fits with part of an inner wall of the through hole and a recess portion assuming external dimensions small enough to ensure that the recess portion does not come into contact with the inner wall of the through hole. The fitting portion may be formed between the flange portion and the recess portion and fits with the part of the inner wall of the through hole toward the flange portion.

It is preferable that the oscillator includes a piezoelectric body excited by a drive signal and an elastic body bonded to the piezoelectric body, that generates the vibrational energy at a drive surface as the piezoelectric body becomes excited.

A pressure applying member may be further provided that presses the oscillator in contact with the mover, wherein the pressure applying member is disposed in close proximity to an outer circumferential surface of the output shaft on a side of the oscillator opposite from a side where the mover is disposed, applies a pressure to the mover at a position between the flange portion and the oscillator, and rotates together with the output shaft. It is preferable to further provide a fixed member that locks the oscillator; an output transmitting member that rotates together with the output shaft and transmits a drive force to a driven member; and a bearing portion disposed between the flange portion and the output transmitting member, that determines a position of the output shaft along a radius of a rotational motion of the output shaft relative to the fixed member and is subjected to the pressure applied by the pressure applying member, and the pressure applying member may be disposed between the bearing portion and the output transmitting member.

A noise reducing member disposed at a position sandwiched between the mover and the flange portion may be further provided. The noise reducing member may be constituted with a material containing ethylene-propylene rubber. The ethylene-propylene rubber may be EPDM (ethylene-propylene-diene-methylene linkage). It is preferable that shore hardness of the noise reducing member is equal to or less than 50. Compressibility calculated for the noise reducing member by dividing a surface pressure applied to the noise reducing member by a modulus of compressive elasticity may be within a range of 0.002~0.25.

In a method for driving a vibrational actuator according to a second aspect of the present invention, a mover is rotationally driven around a first axis with vibrational energy generated at an oscillator; an output shaft is rotated around a second axis by using a rotational force of the mover; pressure is applied to the mover at a position between a flange portion, that rotates together with the output shaft, and the oscillator; and the mover is driven so as to prevent the first axis and the second axis from becoming tilted relative to each other by using an outer portion of the mover over an area where the mover is pressed against the flange portion.

In the method according to the second aspect, when r represents a distance from the first axis to the outer portion of the mover over the area where the mover is pressed against the flange portion and R represents a distance from the first axis to an outer portion of the mover over an area where the mover is pressed against the oscillator, a relationship expressed as r/R≧0.5 may be satisfied. It is preferable that the output shaft and the mover assure a level of freedom that allows the output shaft and the mover to rock relative to each other within a predetermined angle range with regard to the angle formed by the first axis and the second axis. The flange portion may be capable of moving relative to the output shaft. A noise reducing member may be disposed at a position sandwiched between the mover and the flange portion.

BRIEF DESCRIPTION OF THE DRAWINGS

FIG. 3 is a table presenting the results of measurement related to the ratio r/R and noise generation;

FIG. 11 is a table presenting the results of measurement related to shore hardness and noise generation;

FIG. 12 is a table presenting the results of measurement related to the compressibility and noise generation;

DESCRIPTION OF PREFERRED EMBODIMENTS

First Embodiment

The following is a detailed explanation of a vibrational motor (vibrational actuator) according to an embodiment of the present invention, given in reference to the attached drawings. It is to be noted that in the explanation of this and other embodiments, the vibrational motors explained in reference to the individual embodiments are ultrasonic motors that use a vibration wave in the ultrasonic vibration range.

Figure 1:
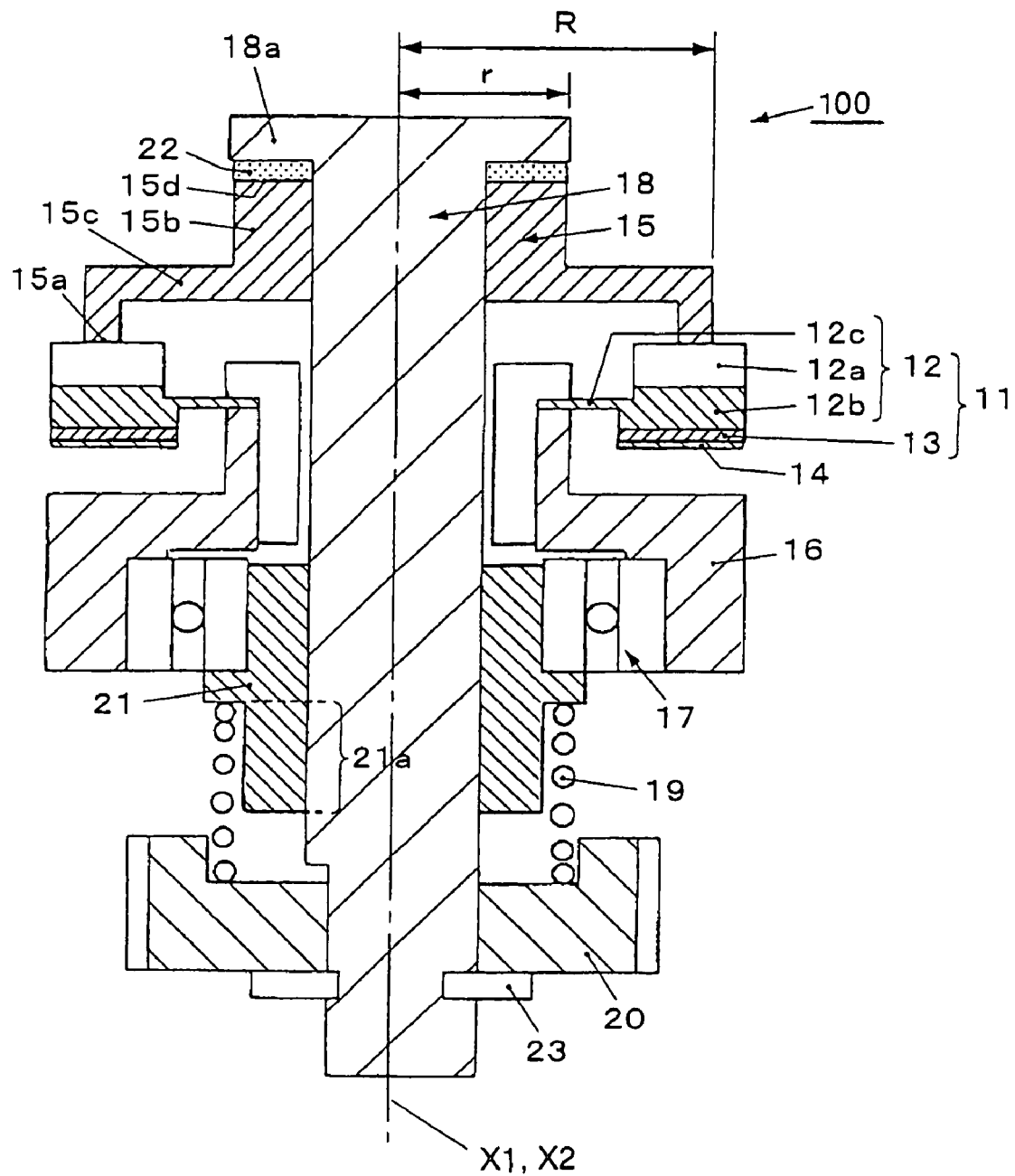
FIG. 1 illustrates a vibrational actuator achieved in a first embodiment of the present invention.

FIG. 1 illustrates the vibrational wave motor according to the first embodiment of the present invention.

An ultrasonic motor 100 achieved in the first embodiment includes a fixed oscillator 11 and a mover 15 that is rotationally driven.

The oscillator (stator) 11 may be a substantially annular member that includes an elastic body 12 and a piezoelectric body 13 bonded to the elastic body 12.

The elastic body 12 is formed by using a metal material with a high level of resonance sharpness and assumes a substantially annular shape. The elastic body 12 includes a tooth-comb portion 12a, a base portion 12b and an elastic flange portion 12c.

The tooth-comb portion 12a is formed by cutting a plurality of grooves into a surface on the side opposite from the side to which the piezoelectric body 13 is bonded. The front end surface of the tooth-comb portion 12a constitutes a drive surface that is pressed in contact with the mover (rotor) 15 to drive the mover 15. The drive surface is treated through Ni—P (nickel-phosphor) plating or the like. The tooth-comb portion 12a is formed so as to set the neutral plane of the progressive vibration wave (vibrational energy) as close as possible to the piezoelectric body 13 and thus amplify the amplitude of the progressive wave at the drive surface.

The base portion 12b ranges continuously along the circumference of the elastic body 12 and the piezoelectric body 13 is bonded to the surface of the base portion 12b on the side opposite from the tooth-comb portion 12a. The elastic flange portion 12c, located at the center along the thickness of the base portion 12b, assumes a substantially collar shape and projects out toward the inner circumference of the elastic body 12. The oscillator 11 is locked to a fixed member 16 via the elastic flange portion 12c.

The piezoelectric body 13 is an electromechanical conversion element that converts electrical energy to mechanical energy and may be constituted with a piezoelectric element or an electrostrictive element. The piezoelectric body 13 includes ranges along the circumferential direction over which two phases (A-phase and B-phase) of electrical signals are input. Over the range corresponding to either phase, elements with alternating polarities are disposed over half-wavelength intervals, with an interval corresponding to a quarter-wavelength formed between the A-phase and the B-phase.

At the surface of the piezoelectric body 13 on the side opposite from the elastic body 12, a flexible printed circuit board 14 from which a drive signal for exciting the piezoelectric body 13 is provided, is connected. The wiring of the flexible printed circuit board 14 is connected to electrodes at the piezoelectric body 13 each corresponding to a specific phase and the piezoelectric body 13 is caused to expand and contract by the drive signal supplied to the flexible printed circuit board 14 from the outside.

The oscillator 11 generates a progressive wave at the drive surface of the elastic body 12 as the piezoelectric body 13 expands and contracts. An explanation is given in reference to the first embodiment on an example in which a four-wave progressive wave is generated.

The mover 15 rotates around a first axis X1. The mover 15, which is constituted of a light metal such as aluminum, is a relative motion member that is rotationally driven via the elliptical motion attributable to the progressive wave generated at the drive surface of the elastic body 12. The mover 15 includes a sliding surface 15a, a fitting portion 15b, a connecting portion 15c and the like.

The sliding surface (sliding portion) 15a, projecting out from the connecting portion 15c to be detailed later toward the oscillator 11, slides while it is pressed in contact with the drive surface of the elastic body 12. The sliding surface 15a has undergone alumite surface treatment or the like so as to assure better abrasion resistance.

The fitting portion 15b, which fits with an output shaft 18 to be detailed later, includes a contact surface 15d (contact portion) that is pressed either directly or indirectly by a flange portion 18a of the output shaft 18 and comes into direct or indirect contact with the flange portion 18a. In the embodiment shown in the figure, the contact surface 15d comes into contact with the flange portion 18a indirectly via a rubber member 22 over the entire surface thereof.

The connecting portion 15c is a portion assuming a substantially collar-like shape, via which the sliding surface 15a and the fitting portion 15b are connected.

The output shaft 18 may be, for instance, a substantially cylindrical member that rotates around a second axis X2. The flange portion 18a assuming a substantially disk shape is disposed at one of the ends of the output shaft 18, whereas a gear member 20 to be detailed later is disposed at the other end. As the flange portion 18a comes into contact with the contact surface 15d of the mover 15 via the rubber member 22, the output shaft 18 is made to rotate as one with the mover 15. In the first embodiment, the radius of the flange portion 18a is set equal to the radius of the outer diameter of the contact surface 15d at the mover 15.

The rubber member 22 is a substantially annular-shaped member constituted of rubber. The rubber member 22 has a function of coupling the mover 15 with the output shaft 18 via the adhesive property of the rubber and a function of absorbing the vibration from the mover 15 so as not to transmit the vibration further to the output shaft 18. Such a rubber member may be constituted of butyl rubber or the like.

The gear member 20 is an output transmitting member that transmits the drive force to a driven member (not shown) as it rotates together with the output shaft 18. The gear member 20 is fitted in a D-cut formed at the output shaft 18 and is locked by a stopper 23 such as an e-ring so as to rotate as one with the output shaft 18 along the same rotating direction and around the same rotational center.

A bearing 17, disposed between the flange portion 18a and the gear member 20 along the first axis X1 and the second axis X2, determines the position of the output shaft 18 along the radial direction of its rotation and receives the pressure applied from a pressure applying spring 19. A bearing receptacle member 21 is disposed on the inner diameter side of the bearing 17, whereas the bearing 17 is disposed on the inner diameter side of the fixed member 16.

The pressure applying spring 19 is a pressure applying member that presses the oscillator 11 and the mover 15 against each other in contact with each other, with one end thereof contacting the bearing 17 via the bearing receptacle member 21 and the other end thereof contacting the gear member 20. The pressure applying spring 19 in the embodiment is constituted with a compression coil spring.

The bearing receptacle member 21 includes an extended portion 21a formed by extending an area thereof where it fits with the output shaft 18. While the pressure applied from the pressure applying spring 19 can be received at the bearing receptacle member 21 even without the extended portion 21a, the extent of offset of the rotational center of the output shaft 18 can be reduced by forming the extended portion 21a so as to increase the length over which the bearing receptacle member 21 is fitted with the output shaft 18.

Figure 2:
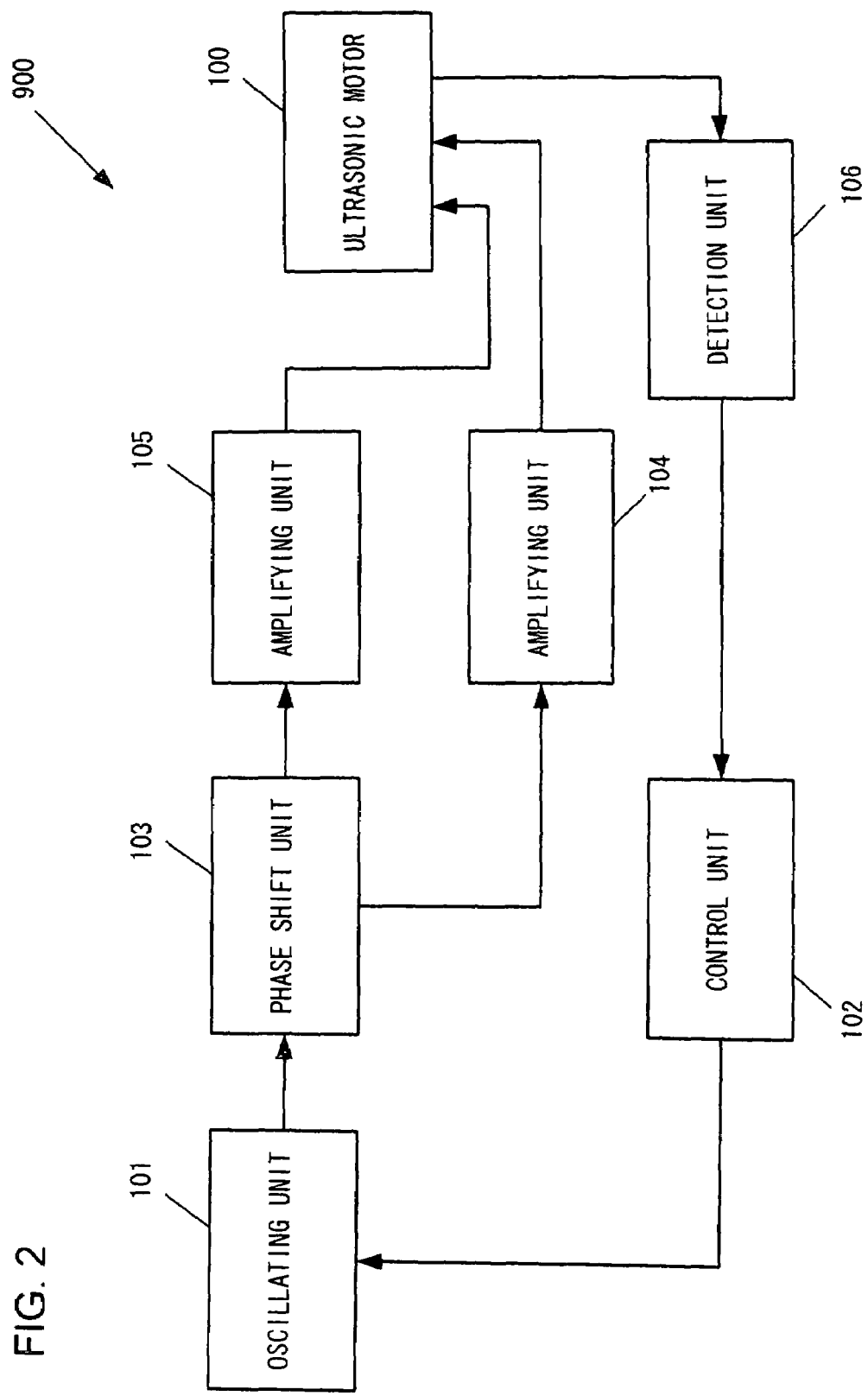
FIG. 2 shows a drive device that includes the vibrational actuator achieved in the first embodiment.

FIG. 2 is a block diagram of an ultrasonic motor control device 900 that drives and controls the ultrasonic motor 100 achieved in the first embodiment.

An oscillating unit 101 generates a drive signal with a desired frequency in response to a command from a control unit 102. A phase shifting unit 103 divides the drive signal generated at the oscillating unit 101 into two drive signals with phases offset from each other by 90°.

Amplifying units 104 and 105 individually boost the voltages of the two drive signals from the phase shifting unit 103 so as to achieve desired voltage levels.

The drive signals from the amplifying unit 104 and 105 are transmitted to the ultrasonic motor 100 where a progressive wave is generated at the oscillator 11 as the drive signals are applied and the mover 15 is thus driven.

A detection unit 106, which is constituted with an optical encoder, a magnetic encoder or the like, detects the position and the speed of the driven member driven as the mover 15 is driven.

The control unit 102 controls the drive of the ultrasonic motor 100 based upon a drive command issued by a CPU (not shown). The control unit 102 having received a detection signal provided by the detection unit 106 obtains position information and speed information based upon the values indicated in the detection signal and controls the frequency of the oscillating unit 101 so as to set the driven member at a target position.

The ultrasonic motor control device 900 achieved in the first embodiment, which adopts the structure described above, engages in operation as explained below.

First, the target position is communicated to the control unit 102. A drive signal generated at the oscillating unit 101 is split into two drive signals with phases offset from each other by 90° at the phase shifting unit 103. The amplifying units 104 and 105 amplify the respective drive signals so as to achieve desired voltage levels.

As the drive signals are applied to the piezoelectric body 13 at the ultrasonic motor 100, the piezoelectric body 13 becomes excited and with the piezoelectric body thus excited, fourth-order bending vibration occurs at the elastic body 12. The piezoelectric body 13 includes different phase portions, i.e., an A-phase portion and a B-phase portion, and the drive signals are individually applied to the A-phase portion and the B-phase portion. The positional phases of the fourth-order bending vibration generated from the A-phase portion and the fourth-order bending vibration generated from the B-phase portion are offset from each other by a quarter-wavelength and the phases of the A-phase drive signal and the B-phase drive signal are offset by 90° relative to each other. Thus, as the two bending vibrations are combined, they become a four-wave progressive wave.

An elliptical motion occurs at the wave front of the progressive wave. Through this elliptical motion, the mover 15 pressed in contact with the drive surface of the elastic body 12 is frictionally driven.

The detection unit 106 such as an optical encoder is disposed at the driven member which is driven as the mover 15 is driven. An electrical pulse signal generated at the detection unit 106 is transmitted to the control unit 102. Based upon this signal, the control unit 102 is able to ascertain the current position and the current speed of the driven member. The control unit 102 then controls the drive frequency at the oscillating unit 101 based upon target position information in addition to the position information and the speed information thus obtained.

Figure 14:
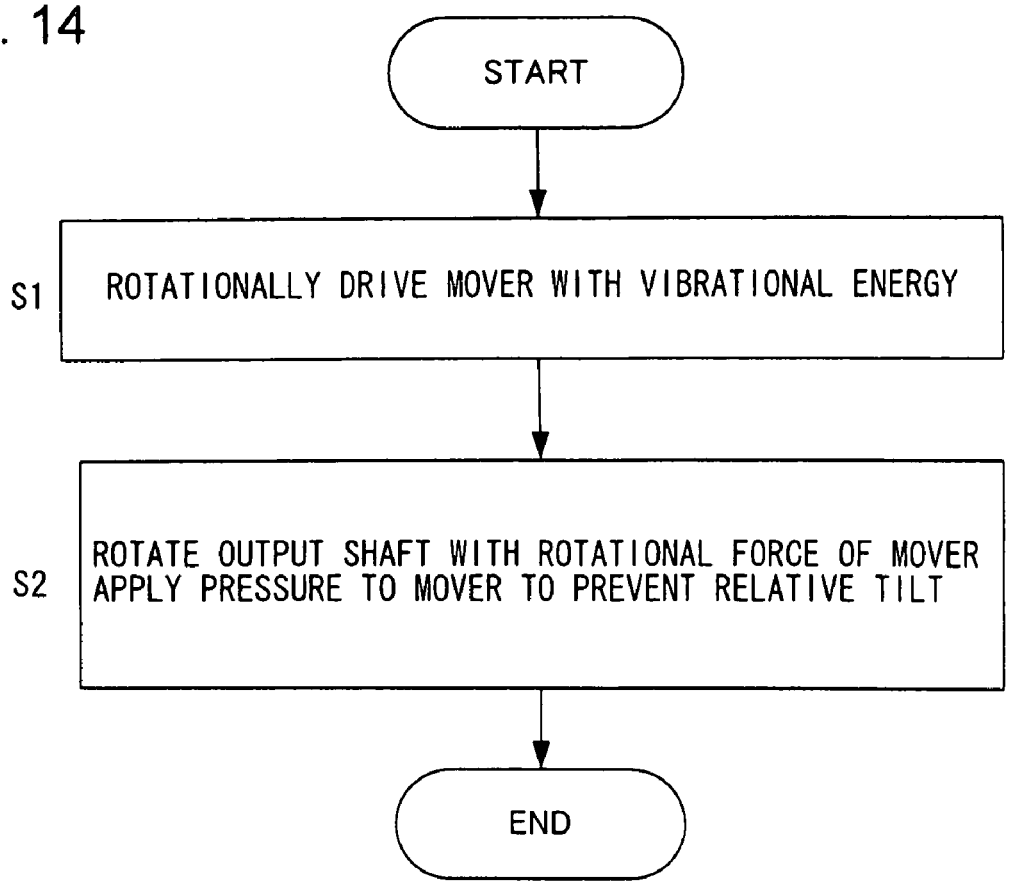
FIG. 14 presents a flowchart of a drive processing procedure for driving an ultrasonic motor, executed by an ultrasonic motor control device achieved in the first embodiment.

The method adopted in the first embodiment to drive the ultrasonic motor 100 via the ultrasonic motor control device 900 is summarized below. FIG. 14 presents a flowchart of the drive processing procedure executed by the ultrasonic motor control device 900 to drive the ultrasonic motor 100.

Using the vibrational energy generated at the oscillator 11, the ultrasonic motor control device 900 rotationally drives the mover 15 around the first axis X1 (step S1). At this time, a pressure is applied to the mover 15 between the flange portion 18a which rotates together with the output shaft 18 and the oscillator 11. The rotational force of the mover 15 causes the output shaft 18 to rotate around the second axis X2 (step S2). The mover 15 is driven so that the portion of the mover 15 which is pressed toward the flange portion 18a, i.e., the outer edge of the contact surface 15d, prevents the first axis X1 and the second axis X2 from becoming tilted relative to each other.

The flange portion 18a in the first embodiment is formed as a projection assuming a substantially disk-like shape. The flange portion 18a is disposed at an end of the output shaft 18 so as to directly or indirectly regulate the position of the mover 15 along the direction in which the pressure is applied from the pressure applying spring 19. The radius r (see FIG. 1), which is half the outer diameter of the portion of the mover 15 whose position is regulated by the flange portion 18a in the contact area of the mover 15 directly or indirectly coming into contact with the flange portion 18a, is set equal to or greater than a predetermined value at which the rotational centers of the mover 15 and the output shaft 18 are prevented from becoming tilted relative to each other. This means that the mover 15 is not allowed to become tilted relative to the output shaft 18 due to deflection or the like of its rotational center even when it rotates at high speed. Thus, even when the motor provided as a compact unit rotates at high speed, no significant noise occurs and a sufficiently large output is obtained by assuring high drive efficiency.

The radius r, which is half the outer diameter of the contact surface 15d of the mover 15 (the distance from the first axis X1 to an outer edge or outer portion of the area of the mover 15 pressed toward the flange portion 18a) and the radius R, which is half the outer diameter of the sliding surface 15a of the mover 15 (the distance from the first axis X1 to an outer edge of the mover 15 pressed against the oscillator 11), may be set respectively to 5.5 mm and 11 mm in the ultrasonic motor 100 in the first embodiment. Namely, the radius r, i.e., half the outer diameter at the contact surface 15d and the radius R, i.e., half the outer diameter at the sliding surface 15a are set so that the ratio r/R is 0.5.

In order to evaluate the noise reducing effect achieved with the ultrasonic motor 100 in the first embodiment, a plurality of ultrasonic motor samples assuming substantially identical shapes to that of the ultrasonic motor 100 and achieves varying values for the ratio r/R of the radius r corresponding to the outer diameter at the contact surface 15d and the radius R corresponding to the outer diameter at the sliding surface 15a were prepared. They were driven under identical conditions and the conditions of noise occurrence were investigated.

FIG. 3 is a table presenting the results of noise measurement in relation to the ratio r/R of the radius r corresponding to the outer diameter at the contact surface 15d and the radius R corresponding to the outer diameter at the sliding surface 15a.

As the measurement results presented in FIG. 3 indicate, when the ratio r/R of the radius r corresponding to the outer diameter at the contact surface 15d and the radius R corresponding to the outer diameter at the sliding surface 15a is equal to or greater than 0.5, the mover 15 is prevented from flattening out relative to the rotational center of the output shaft 18 and thus noise is effectively attenuated.

It is to be noted that the radius r, i.e., half the outer diameter of the contact surface 15d assuming a value that will set the ratio r/R greater than 1 is bound to be greater than the radius corresponding to the outer diameter of the ultrasonic motor 100 and accordingly, it should be ensured that the value of the ratio r/R is always equal to or less than 1.

However, as a greater value is assumed for the radius r corresponding to the outer diameter at the contact surface 15d, the moment of inertia also increases, which is bound to lead to problems such as poor startup characteristics. For this reason, a value that sets the ratio r/R equal to or greater than 0.5 so as to achieve a significant noise reducing effect but does not adversely affect the drive characteristics should be set for the radius r corresponding to the outer diameter at the contact surface 15d.

In the first embodiment, the radius R, i.e., half the outer diameter at the sliding surface 15a and the radius r, i.e., half the outer diameter at the contact surface 15d, are set so that the ratio r/R is equal to or greater than 0.5. As a result, even in a more compact motor with a higher rated rotation speed, in which the mover 15 rotates at higher speed, the rotational centers of the mover 15 and the output shaft 18 are not allowed to become tilted relative to each other and the mover 15 is prevented from flattening out relative to the axial center of the output shaft 18. Thus, even in a more compact motor that needs to rotate at higher speed in order to assure a specific output (rotation speed×torque), the occurrence of noise is minimized. In addition, by adopting the first embodiment, a vibrational wave motor with high drive efficiency assuring a sufficiently large output is provided.

Furthermore, since the drive surface of the oscillator 11 and the sliding surface 15a of the mover 15 are allowed to slide against each other in a stable manner, more stable drive characteristics are assured.

Moreover, by adopting the first embodiment in which the bearing receptacle member 21 disposed between the bearing member 17 and the output shaft 18 is allowed to fit with the output shaft 18 over a greater range, the output shaft 18 is held steady. As a result, a stable pressure can be applied from the flange portion 18a to the mover 15, which prevents the mover 15 from flattening out relative to the output shaft 18.

A pressure can be applied at a position distanced from the sliding portion of the mover 15 from the pressure applying spring 19 disposed between the gear member 20 and the bearing 17. Thus, factors such as an offset of the point of the pressure application by the pressure applying spring 19 and inconsistent pressure application do not adversely affect the mover 15.

Second Embodiment

Figure 4:
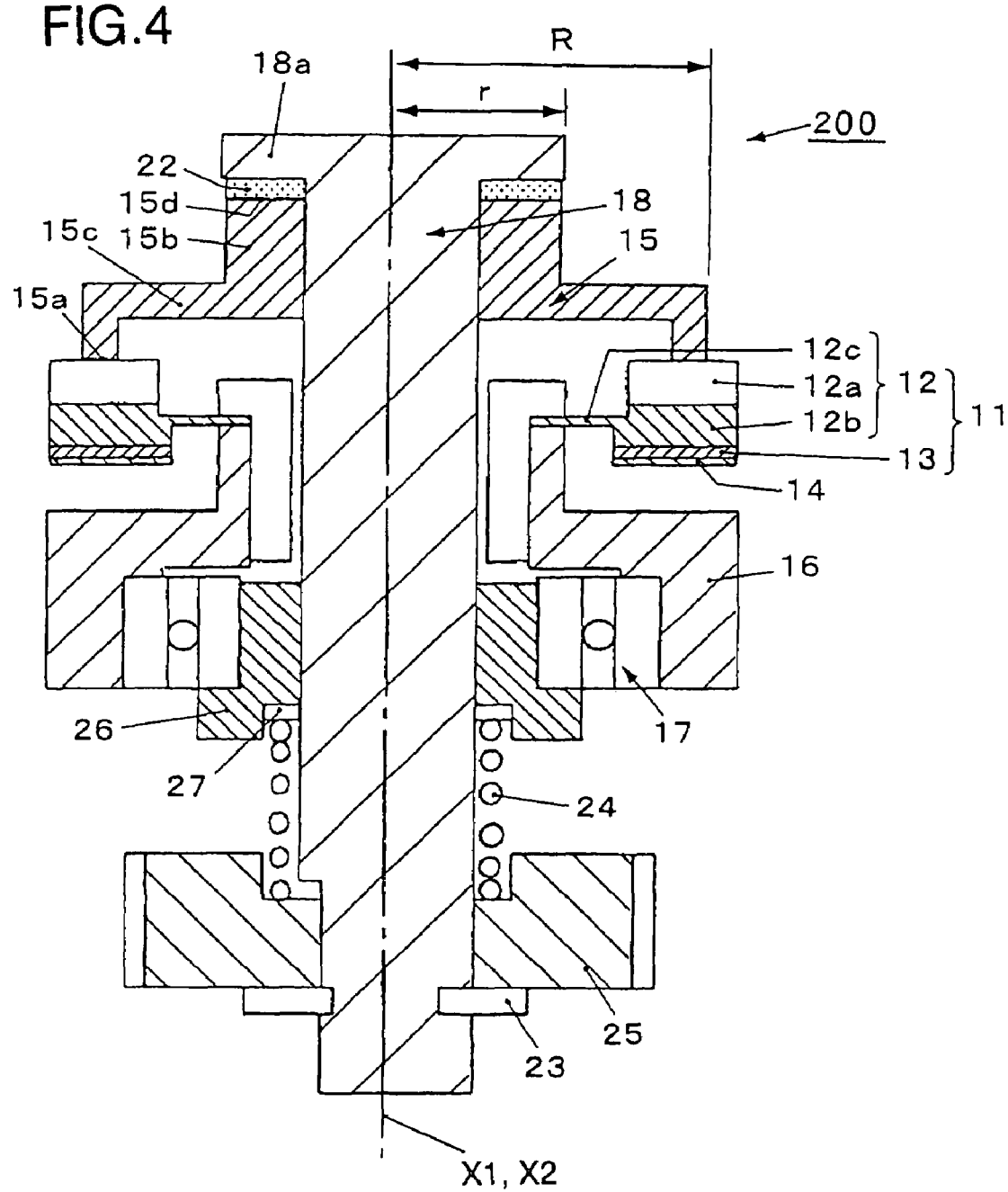
FIG. 4 illustrates a vibrational actuator achieved in a second embodiment.

FIG. 4 illustrates a vibrational wave motor achieved in the second embodiment of the present invention.

An ultrasonic motor 200 achieved in the second embodiment includes a pressure applying spring (coil spring) 24 with a diameter assuming a value different from that of the pressure applying spring 19 in the ultrasonic motor 100 achieved in the first embodiment. It is to be noted that the same reference numerals are assigned to components of the second embodiment described below, which have functions similar to those of the ultrasonic motor 100 in the first embodiment, so as to preclude the necessity for a repeated explanation thereof.

The pressure applying spring 24 in the ultrasonic motor 200 in the second embodiment is disposed in close proximity to the outer circumferential surface of the output shaft 18 and its coil diameter is smaller than that of the pressure applying spring 19 in the first embodiment. In addition, a bearing receptacle member 26 and the output shaft 18 fit with each other over a range shorter than the fitting range of the bearing receptacle member 21 in the first embodiment. A pressure application adjustment washer 27 is disposed between the pressure applying spring 24 and the bearing receptacle member 26.

The pressure applying spring 24 in the second embodiment is allowed to apply pressure at a position closer to the rotational center of the mover 15, i.e., the first axis X1 compared to the pressure application position in the first embodiment. This means that the extent to which the mover 15 becomes tilted relative to the output shaft 18 due to uneven application of pressure to the mover 15 is minimized. As the drive surface of the oscillator 11 and the sliding surface 15a of the mover 15 are allowed to slide against each other in a stable manner, noise does not occur readily even in a more compact motor that needs to rotate at higher speed in order to obtain a specific output and better drive efficiency is assured.

Third Embodiment

Figure 5:
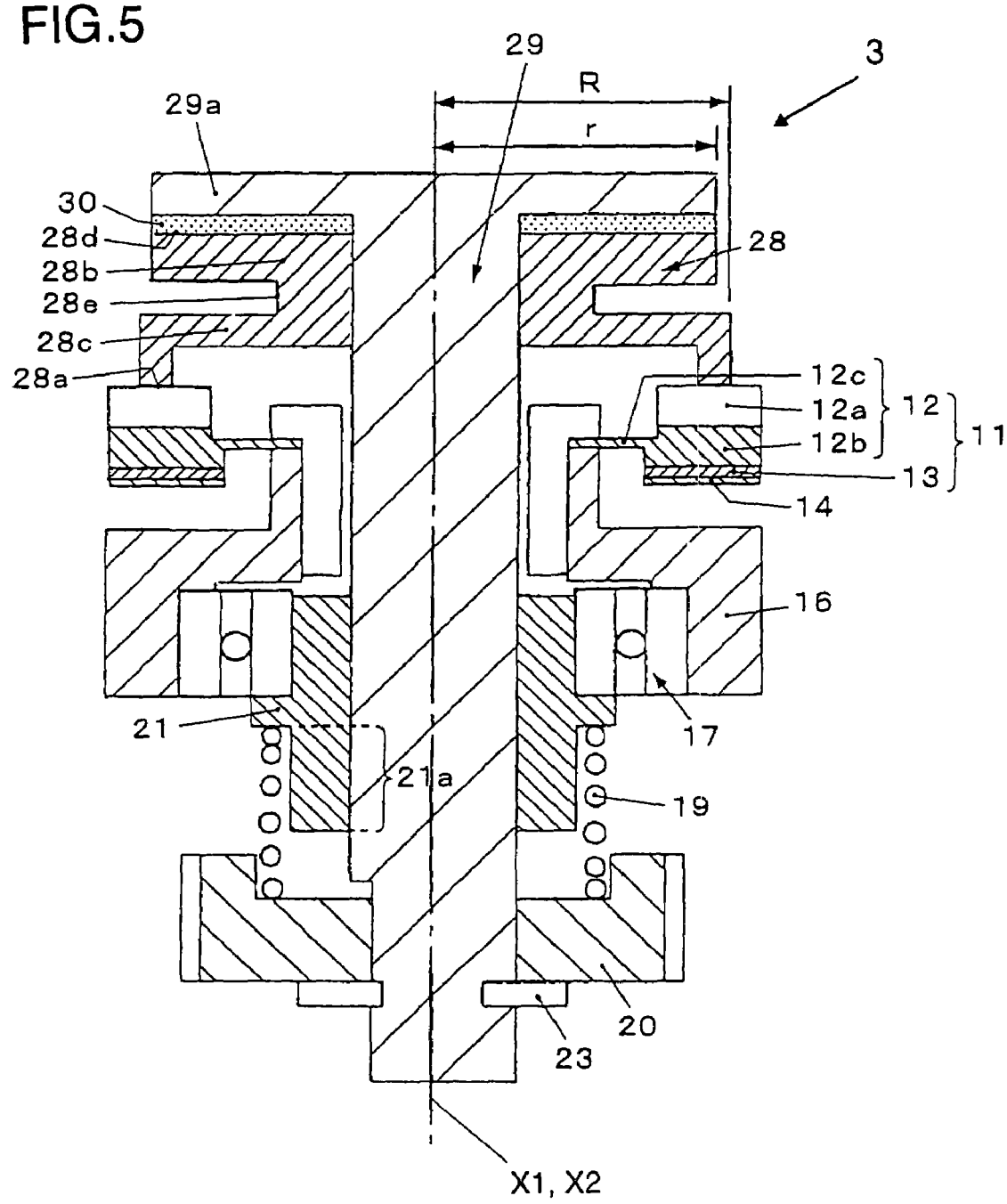
FIG. 5 illustrates a vibrational actuator achieved in a third embodiment.

FIG. 5 illustrates a vibrational wave motor achieved in the third embodiment of the present invention.

An ultrasonic motor 3 achieved in the third embodiment includes a mover 28 and an output shaft 29 assuming shapes different from those of the mover 15 and the output shaft 18 in the ultrasonic motor 100 in the first embodiment.

The mover 28 includes a sliding surface 28a that is pressed in contact with the drive surface of the oscillator 11 and slides against the drive surface, a fitting portion 28b that is fitted with the output shaft 29, a contact surface 28d that comes into contact with a flange portion 29a of the output shaft 29 to be detailed later over its entire surface via a rubber member 30, a bottleneck portion 28e formed at the fitting portion 28b and a connecting portion 28c that connects the sliding surface 28a with the fitting portion 28b.

The mover 28 in the third embodiment, which does not assume a substantially cylindrical shape, includes the connecting portion 28c in conjunction with which the bottleneck portion 28e is formed. In this structure, the flexure of the connecting portion 28c is used to advantage so that even if the mover 28 becomes tilted relative to the output shaft 29, the drive surface of the oscillator 11 and the sliding surface 28a of the mover 28 are still allowed to slide against each other in a stable manner without forming an angle.

The output shaft 29 includes a substantially disk-shaped flange portion 29a formed at one end thereof. The diameter of the flange portion 29a is equal to the outer diameter of the contact surface 28d of the mover 28. The radius corresponding to the outer diameter of the portion over which the position of the contact surface 28d is regulated by the flange portion 29a is substantially equal to the radius, i.e., half the outer diameter of the contact surface 28a.

In the third embodiment, the radius r corresponding to the outer diameter at the contact surface 28d (the distance from the first axis X1 to the outer edge of the portion of the mover 28 pressed by the flange 29a) and the radius R corresponding to the outer diameter at the sliding surface 28a are set so that the ratio r/R is equal to, for instance, 0.95.

With the ratio of the radius r corresponding to the outer diameter at the contact surface 28d and the radius R corresponding to the outer diameter at the sliding surface 28a further increased, the extent to which the mover 28 is allowed to flatten out relative to the output shaft 18 can be further reduced, and thus, noise can be effectively reduced.

Fourth Embodiment

Figure 6:
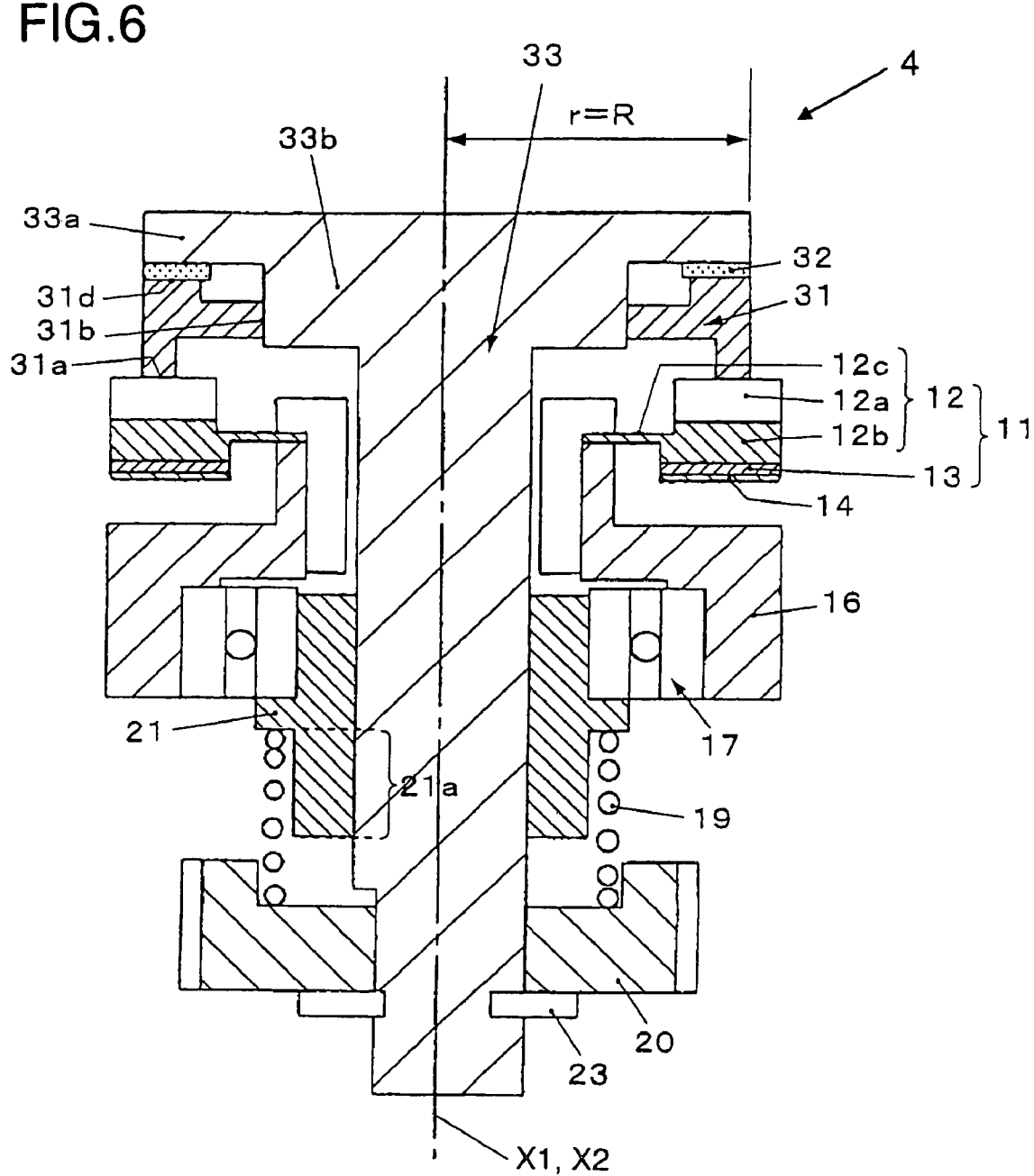
FIG. 6 illustrates a vibrational actuator achieved in a fourth embodiment.

FIG. 6 illustrates a vibrational wave motor achieved in the fourth embodiment of the present invention.

An ultrasonic motor 4 achieved in the fourth embodiment includes a mover 31 and an output shaft 33 assuming shapes different from those of the mover 15 and the output shaft 18 in the ultrasonic motor 100 in the first embodiment.

The mover 31 includes a sliding surface 31a that is pressed in contact with the drive surface of the oscillator 11 and slides against the drive surface, a fitting portion 31b that fits with an output shaft-side fitting portion 33b of the output shaft 33 to be detailed later and a contact surface 31d that comes into contact with a flange portion 33a of the output shaft 33 over its entire surface via a rubber member 32.

The output shaft 33 includes the flange portion 33a assuming a substantially annular shape and formed at the front end thereof and the output shaft-side fitting portion 33b that fits with the mover 31. The diameter of the flange portion 33a is equal to the outer diameter at the sliding surface 31a and the contact surface 31d of the mover 31. The radius r corresponding to the outer diameter at the contact surface 31d (the radius, i.e., half the outer diameter of the area, the position of which is regulated by the flange portion 33a) is equal to the diameter R corresponding to the outer diameter at the sliding surface 31a and thus, there ratio r/R is equal to 1.0.

By adopting the fourth embodiment in which the radius r corresponding to the outer diameter at the contact surface 31d is set equal to the radius R corresponding to the outer diameter at the sliding surface 31a, the extent to which the mover 31 is allowed to flatten out relative to the output shaft 33 can be further reduced. As a result, noise occurs to an even lesser extent.

(Examples of Variations)

The present invention is not limited to the first through fourth embodiments explained above and allows for numerous variations and modifications which are equally considered to be within the scope of the present invention.

(1) The bearing receptacle member 26 in the second embodiment does not include an extended portion over the area where it fits with the output shaft 18 and thus, the range over which the bearing receptacle member 26 fits with the output shaft 18 is shorter than that of the bearing receptacle member 21 in the first embodiment. However, the present invention is not limited to this example and the bearing receptacle member 26 may also include an extended portion similar to that in the bearing receptacle portion 21 in the first embodiment so as to lengthen the fitting range. In addition, the pressure applying spring 24 may be disposed in close proximity to the outer circumferential surface of the output shaft 18.

(2) In the third and fourth embodiments, one end of the pressure applying spring 19 is set in contact with the bearing receptacle member 21 that includes the extended portion 21a. However, the present invention is not limited to this example and the pressure applying spring may instead be disposed in close proximity to the outer circumferential surface of the output shaft as has been explained in reference to the second embodiment.

(3) In the first through fourth embodiments, the pressure applying springs 19 and 24 are respectively disposed in contact with the gear members 20 and 25 at one end thereof. However, the present invention is not limited to this example and one end of the pressure applying spring 19 or 24 may be disposed so as to be in contact with a retaining ring that holds one end of the pressure applying spring 19 or 24.

Fifth Embodiment

Figure 7:
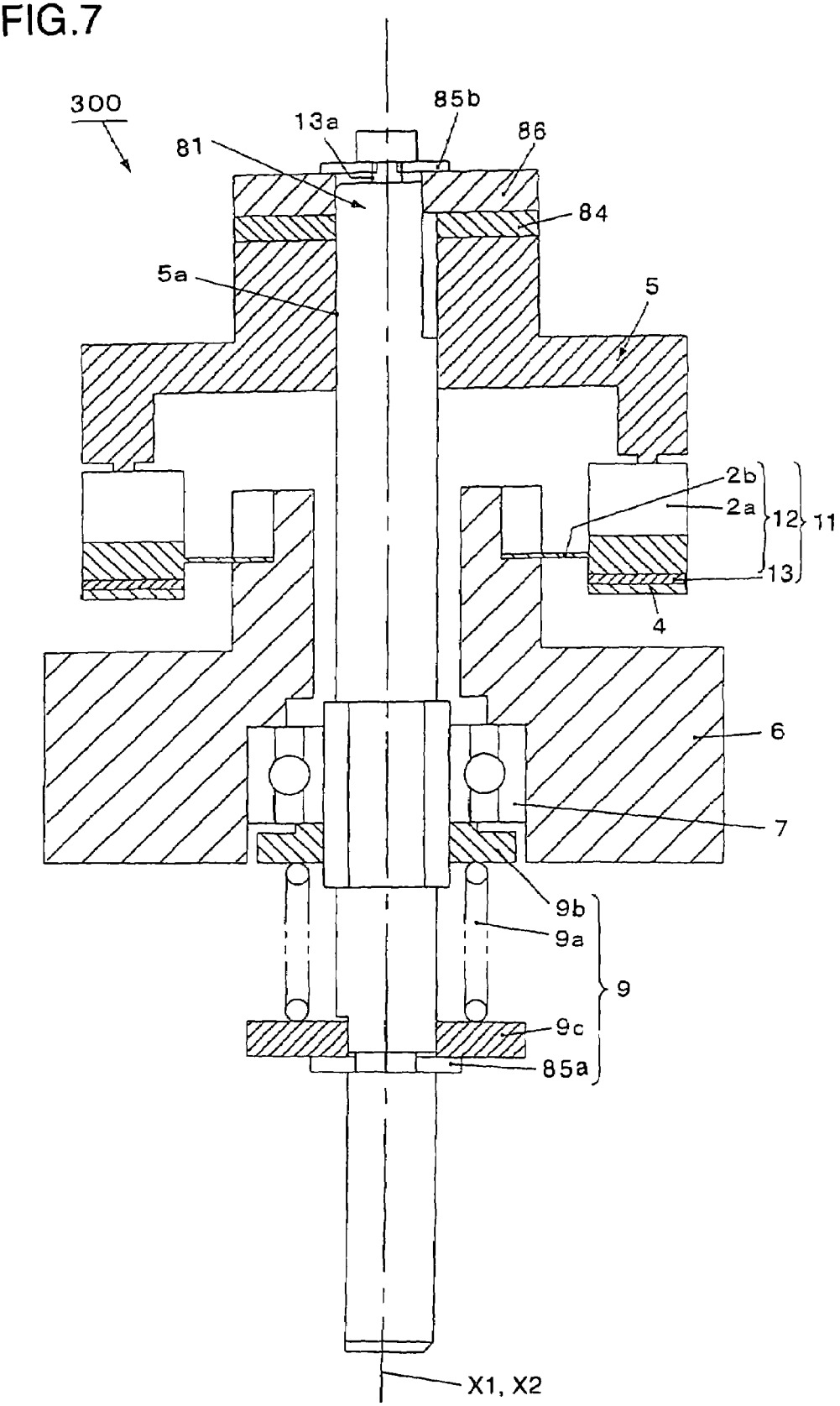
FIG. 7 is a sectional view schematically showing a vibrational actuator achieved in a fifth embodiment.

FIG. 7 is a schematic sectional view of a vibrational actuator achieved in the fifth embodiment of the present invention.

A vibrational actuator 300 achieved in the fifth embodiment includes a fixed oscillator 11, a rotor (mover) 5 that is rotationally driven and the like.

As the piezoelectric body 13 is excited, a progressive vibrational wave (hereafter referred to as the "progressive wave") is generated at the oscillator 11. The following explanation is given by assuming that the progressive wave generated at the oscillator 11 contains 4 waves per cycle.

The oscillator 11 is mounted at a stator mounting base 6 via an elastic flange portion 2b. An output shaft 81 to be detailed later is rotatably mounted at the stator mounting base 6 via a bearing 7.

The rotor 5 is a rotating element formed around a central axis set at the center of its rotation (first axis X1), with a substantially cylindrical through hole 5a formed at the center thereof. The output shaft 81 is fitted inside the through hole 5a, and the diameter of the through hole 5a is greater than the diameter of the output shaft 81 by an extent corresponding to the tolerance.

The output shaft 81, which rotates around a second axis X2, is a substantially cylindrical member constituted of, for instance, a resin. The output shaft 81 is fitted inside the through hole 5a at the rotor 5, and functions as an output extracting member that extracts the rotational motion of the rotor 5 as the output shaft rotates together with the rotor 5. At least part of the end of the output shaft 81 that fits in the through hole 5a of the rotor 5 is D-cut, and the other end of the output shaft 81 is bonded to a gear or the like (not shown) that transmits the output to the driven member.

A flange ring 86, which fits with the output shaft 81 and is allowed to move along the line of rotational center (the second axis X2) of the output shaft 81, rotates together with the output shaft 81. A buffer member 84 is disposed between the flange ring 86 and the rotor 5. The buffer member 84 assuming a substantially annular shape and constituted of, for instance, rubber or the like, fits with the output shaft 81 and absorbs vibration of the rotor 5 along the line of the center of its rotation (the first axis X1).

An E-ring 85b, which is fitted in a groove 13a formed at an end of the output shaft 81, is a regulating member that regulates the positions of the flange ring 86 and the rotor 5 relative to the output shaft 81 along the direction in which the pressure is applied by a pressure applying portion 9 to be detailed later.

The pressure applying portion 9 is a mechanism that presses the oscillator 11 and the rotor 5 against each other in contact, and is disposed at the output shaft 81. The pressure applying portion 9 includes a spring 9a that generates a pressure to be applied, a retaining ring 9b that is disposed in contact with the bearing 7 and holds one end of the spring 9a, a retaining ring 9c that holds the other end of the spring 9a and an E-ring 85a that is inserted in a groove formed at the output shaft 81 and regulates the position of the retaining ring 9c.

The pressure applying portion 9 presses the oscillator 11 onto the rotor 5 along the line of the rotational center of the output shaft 81.

The output shaft 81 and the rotor 5 in the fifth embodiment are allowed to rotate freely while rocking relative to each other even when the line of the rotational center of the output shaft 81 (the second axis X2) and the line of the rotational center of the rotor 5 (the first axis X1) form an angle within a predetermined range. As a result, a compact vibrational actuator in which noise occurs to a lesser extent can be provided.

Namely, even when an external force is applied to the output shaft 81 along a direction other than the direction in which the line of the rotational center extends and the line of the rotational center of the output shaft 81 (the second axis X2) forms an angle relative to the line of the rotational center of the rotor 5 (the first axis X1), the sliding surface of the rotor 5 in the fifth embodiment is allowed to slide in a stable manner against the drive surface of the oscillator 11 without forming an angle. As a result, the startup characteristics and the drive efficiency are improved and the occurrence of noise is reduced. In addition, even if the oscillator 11 is not fixed perpendicular to the output extracting member, i.e., the output shaft 81, due to inconsistent assembly, a dimensional defect or the like or even if the drive surface of the oscillator 11 becomes tilted due to a temperature change, the drive surface at the oscillator 11 and the sliding surface of the rotor 5 are allowed to slide against each other in a stable manner, thereby providing an actuator with desirable startup performance and drive efficiency, in which abnormal noise does not occur readily.

The flange ring 86 in the fifth embodiment fits with the output shaft 81, is allowed to move along the line of the rotational center of the output shaft 81 and rotates together with the output shaft 81. The regulating member, e.g., the e-ring 85b, regulates the positions of the flange ring 86 and the rotor 5 relative to the output shaft 81 along the direction in which the pressure is applied by the pressure applying portion 9. By adopting such a structure, the flange ring 86 provided as a separate member independent of the output shaft 81 does not readily follow a tilting movement of the output shaft 81 to become tilted even when, for instance, an external force is applied to the output shaft 81 along a direction other than the direction in which the line of its rotational center extends to allow an angle to be formed by the line of the rotational center of the output shaft 81 and the line of the rotational center of the rotor 5 and thus, the line of the rotational center of the output shaft 81 is no longer perpendicular to the drive surface at the oscillator 11. Consequently, the drive surface of the oscillator 11 and the sliding surface at the rotor 5 can slide against each other in a stable manner.

In addition, the regulating member, e.g., the E-ring 85b which is a retainer ring fitted in the groove 13a formed at the output shaft 81, can be constituted with a universal member, which makes it possible to keep down the production cost.

Furthermore, the buffer member 84 disposed between the flange ring 86 and the rotor 5 absorbs the vibration of the rotor 5 along the line of its rotational center. As a result, abnormal noise occurring when the rotor 5 is driven and generates noise as it vibrates along the line of its rotational center is reduced. At the same time, the rotating motion of the rotor 5 is stabilized, which, in turn, improves the drive efficiency.

Next, the advantages of the vibrational actuator 300 achieved in the fifth embodiment are explained in further detail in comparison to another vibrational actuator. It is to be noted that the following explanation is provided to describe outstanding advantages of the fifth embodiment, and its intention is not to discredit the performance viability of the vibrational actuator presented as the comparison example.

Figure 8:
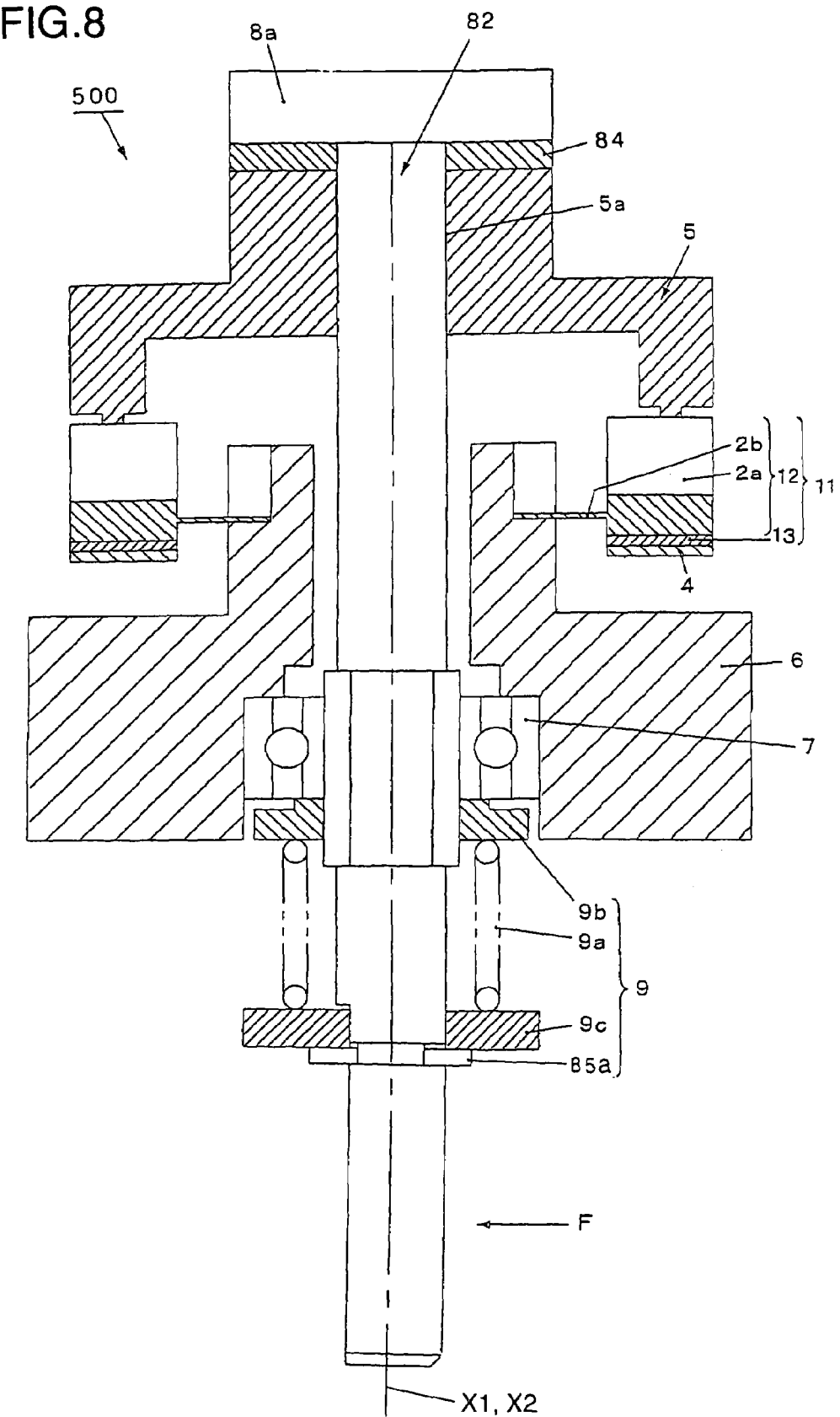
FIG. 8 is a schematic sectional view of an example to be compared with the vibrational actuator in the fifth embodiment.

FIG. 8 is a schematic sectional view of the vibrational actuator representing an example to be compared with the vibrational actuator according to the present invention.

A vibrational actuator 500 in the comparison example differs from the vibrational actuator 300 in the fifth embodiment shown in FIG. 7 in the shape adopted in its output shaft 82 and the like. Accordingly, the same reference numerals are assigned to components thereof that have functions substantially identical to those of the vibrational actuator 300 in the fifth embodiment shown in FIG. 7 so as to eliminate the necessity for a repeated explanation thereof.

The output shaft 82 in FIG. 8 assuming a substantially cylindrical shape is an output extracting member that fits in the through hole 5a at the rotor 5, rotates together with the rotor 5 and extracts the rotational motion of the rotor as an output. A substantially disk-shaped flange portion 8a is formed at the end of the output shaft 82 that is fitted in the through hole 5a, whereas a gear or the like (not shown) that communicates the output to a driven member (not shown) is bonded to the other end of the output shaft 82.

The buffer member 84 that absorbs vibration of the rotor 5 along the line of the rotational center of the rotor 5 is disposed between the flange portion 8*a* and the rotor 5.

Generally speaking, the drive surface of the rotor and the drive surface of the elastic body in such a vibrational actuator are allowed to slide against each other in a stable manner when the line of the rotational center of the output shaft (the second axis) and the line of the rotational center of the rotor (the first axis) are aligned with each other and the drive force is perpendicular to the drive surface of the stator. In other words, these are the ideal conditions under which the vibrational actuator will not generate any abnormal noise and achieves desirable startup performance and drive efficiency.

However, in the vibrational actuator 500 in the comparison example shown in FIG. 8, the flange portion 8*a* of the output shaft 82 regulates the movement of the rotor 5 along the line of its rotational center via the buffer member 84 and the like and also the portion of the output shaft 8 that fits in the through hole 5*a* regulates the movement of the rotor 5 along the radius of its rotational motion.

For this reason, if an external force is applied to the output shaft 82 from a direction other than the direction in which the line of its rotational center extends, e.g., if the output shaft 82 is subjected to the external force indicated by the arrow F in the figure, the line of the rotational center of the output shaft 82 (the second axis X2) becomes tilted to form an angle relative to the line of the rotational center of the rotor 5 (the first axis X1). As a result, the output axis is no longer perpendicular to the drive surface of the elastic body 12. Under an offset load, the rotor 5 follows the tilting motion of the output shaft 82 and becomes tilted as well. Thus, its sliding surface forms an angle relative to the drive surface of the elastic body 12, which may somewhat lower the stability of the sliding motion of the drive surface at the elastic body 12 and the sliding surface at the rotor 5 against each other.

As the vibrational actuator 500 in the comparison example is driven in this state, the progressive wave at the elastic body 12 is not fully transmitted to the rotor 5, which leads to a concern that the drive efficiency of the vibrational actuator 500 in the comparison example may be somewhat lowered and that noise may occur in the vibrational actuator 500.

The vibrational actuator 300 in the fifth embodiment, on the other hand, includes the flange ring 86 provided as a separate member independent of the output shaft 81. Thus, even if an external force is applied to the output shaft 81 from a direction other than the direction in which the line of its rotational center extends and the output shaft 81 becomes tilted, the flange ring 86 does not follow the tilting displacement of the output shaft 81 readily. Since the flange ring 86 does not become tilted, the rotor 5 does not become tilted, either.

In short, in the actuator 300 that includes the output shaft 81 the flange ring 86 and the like described above, the rotor 5 and the output shaft 81 are allowed to rock relative to each other while they rotate together. Consequently, the sliding surface of the rotor 5 and the drive surface of the elastic body 12 are allowed to slide against each other in a stable manner, which makes it possible to provide a compact vibrational actuator with high startup performance and high drive efficiency while ensuring that noise does not occur readily regardless of the speed range over which the rotor 5 is driven.

Furthermore, similar operational effects can be achieved in the vibrational actuator 300 in the fifth embodiment even when the elastic body 12 is not fixed perpendicular to the output shaft 81 due to inconsistent assembly, a dimensional defect or the like or the drive surface of the elastic body 12 becomes tilted due to a temperature change or the like.

If the drive surface of the elastic body 12 is not fixed perpendicular to the line of the rotational center of the output shaft 82 due to inconsistent assembly, a dimensional defect or the like that may occur during the manufacturing process or if the drive surface of the elastic body 12 becomes tilted due to a temperature change or the like, the sliding surface of the rotor 5 will follow the tilting motion of the drive surface of the elastic body 12 and will become tilted as well. As the rotor 5 becomes tilted, the line of the rotational center of the output shaft 82, too, will become tilted. Under such conditions, noise may occur in the vibrational actuator 500 or the startup performance or the drive efficiency of the vibrational actuator 500 may be somewhat compromised.

In the vibrational actuator 300 achieved in the fifth embodiment, the output shaft 81 and the flange ring 86 are formed as separate, independent members. By adopting such a structure, a level of freedom between the output shaft 81 and the flange ring 86 is assured, and thus the output shaft 81 does not readily follow the tilted rotor 5 to become tilted even when, for instance, the drive surface of the elastic body 12 is tilted, causing the sliding surface of the rotor 5 and the flange ring 86 to be tilted.

Sixth Embodiment

Figure 9:
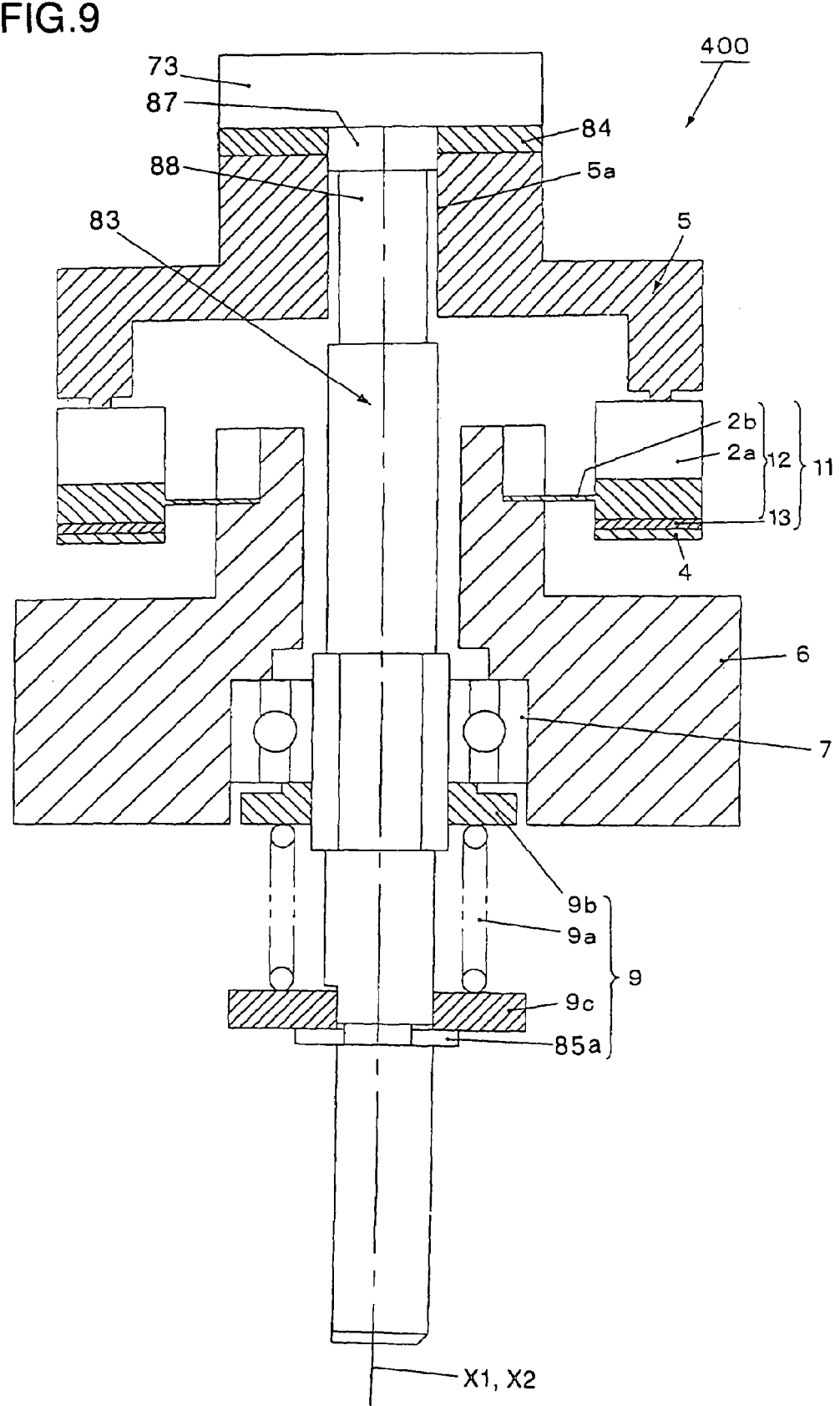
FIG. 9 is a sectional view schematically showing a vibrational actuator achieved in a sixth embodiment.

FIG. 9 is a schematic sectional view of a vibrational actuator achieved in the sixth embodiment of the present invention.

A vibrational actuator 400 achieved in the sixth embodiment includes an output shaft 83 assuming a shape different from that of the output shaft 81 in the vibrational actuator 300 in the fifth embodiment. The same reference numerals are assigned to components having substantially identical functions to those of the vibrational actuator 300 in the fifth embodiment shown in FIG. 7 to preclude the necessity for a repeated explanation thereof.

The output shaft 83 is a substantially cylindrical member constituted of a resin, with a flange portion 73, a fitting portion 87 and a recess portion 88 formed at one end thereof and a gear or the like (not shown) that transmits an output to the driven member bonded to the other end thereof. Namely, the output shaft 83 is an integrated member that includes the flange portion 73, the fitting portion 87 and the recess portion 88 formed as integrated parts thereof.

The flange portion 73, located at an end of the output shaft 83, assumes a substantially disk-like shape and regulates the position of the rotor 5 relative to the output shaft 83 along the direction in which the pressure is applied from the pressure applying portion 9. A buffer member 84 is disposed between the flange portion 83 and the rotor 5.

The fitting portion 87, located between the flange portion 73 and the recess portion 88 to be detailed later, fits with part of the inner wall of the through hole 5*a* at the rotor 5.

The recess portion 88 is formed by ensuring that its external dimensions are small enough so as not to contact the inner wall of the through hole 5*a*.

As shown in FIG. 9, the output shaft 83 and the rotor 5 fit with each other only via the fitting portion 87 and the inner wall of the through hole 5*a* at the end thereof toward the flange portion 73. At the output shaft 83 further toward the bearing 7 relative to the fitting portion 87, the recess portion 88 is formed and thus, the output shaft 83 does not contact the inner wall of the through hole 5*a* over the recess portion 88.

With the output shaft 83 structured as described above, the point at which the fitting portion 87 regulates the movement of the rotor 5 along the radius of the rotational motion of the rotor 5 and the point at which the flange portion 73 regulates the movement of the rotor 5 along the line of the rotational center of the rotor 5 are set closer to each other. Thus, the output shaft 83 and the rotor 5 are allowed to rotate together to transmit the drive force, while maintaining a higher level of freedom.

In addition, even if the output shaft 83, which includes the fitting portion 87 and the recess portion 88, becomes tilted relative to the rotor 5 to result in an angle formed by the line of the rotational center of the rotor 5 (the first axis X1) and the line of the rotational center of the output shaft 83 (the second axis X2), no part of the output shaft 83 other than the fitting portion 87 comes in contact with the inner wall of the through hole 5a at the rotor 5. As a result, the rotor 5 is able to slide in a stable manner without its drive surface forming an angle relative to the drive surface of the elastic body 12.

Furthermore, even when an angle is formed by the line of the rotational center of the output shaft 83 and the line of the rotational center of the rotor 5, the output shaft 83 does not come in contact with the inner wall of the through hole 5a at the rotor 50 to tilt the rotor 5 in the structure achieved in the sixth embodiment. Consequently, the drive surface of the oscillator 11 and the sliding surface of the rotor 5 are allowed to slide against each other in a stable manner to improve the startup performance and the drive efficiency while reducing the occurrence of noise.

In addition, the fitting portion 87, formed between the flange portion 73 and the recess portion 88, fits with the inner wall of the through hole 5a over the area toward the flange portion 73. As a result, when the line of the rotational center of the output shaft 83 and the line of the rotational center of the rotor 5 form an angle, the point at which the fitting portion 87 regulates the movement of the rotor 5 and the point at which the flange portion 73 regulates the movement of the rotor 5 are set closer to each other. Thus, the output shaft 83 and the rotor 5 are allowed to rotate together to transmit the drive force, while maintaining a higher level of freedom.

Moreover, the actuator 400 includes the buffer member 84 which is disposed between the flange portion 73, and the relative motion member, e.g., the rotor 5, and absorbs the vibration of the rotor 5 along the line of its rotational center. As a result, any noise that may result from vibration of the rotor 5 along the line of its rotational center is prevented and, at the same time, the drive efficiency is improved by stabilizing the rotational motion of the rotor 5.

The rotor 5 and the output shaft 83 in the sixth embodiment are allowed to rock relative to each other while they both rotate as in the vibrational actuator 300 in the fifth embodiment. Thus, a vibrational actuator with superior startup performance and drive efficiency, in which noise does not occur readily, can be provided.

Furthermore, since the vibrational actuator 400 in the sixth embodiment can be achieved with fewer parts compared to the vibrational actuator 300 in the fifth embodiment, its manufacturing process can be simplified, which, in turn, leads to a reduction in the production cost.

(Examples of Variations)

The present invention is not limited to the fifth and sixth embodiments explained above and allows for numerous variations and modifications which are equally considered to be within the scope of the present invention.

(1) While the output shafts 81 and 83 in the fifth and sixth embodiments are formed by using a resin, no specific limitations are imposed with regard to the material to constitute the output shaft. For instance, the output shaft may be constituted of a metal or the like.

(2) While the output shaft 81 in the fifth embodiment includes the flange ring 86 and the E-ring 85b and the output shaft 83 in the sixth embodiment includes the flange portion 73, the fitting portion 87 and the recess portion 88, an output shaft that includes the above listed features in an optimal combination may be used.

(3) While the output shaft 83 in the sixth embodiment is an integrated member constituted of a resin, the present invention is not limited to this example and the flange portion 73 may be formed as a separate part independent of the output shaft, instead.

Seventh Embodiment

The following is a detailed explanation of the seventh embodiment of the present invention, given in reference to attached drawings. It is to be noted that the explanation on the current embodiment and the subsequent embodiment is given by assuming that the vibrational motor (vibrational actuator) is an ultrasonic motor that operates in the ultrasonic vibration range.

Figure 10:
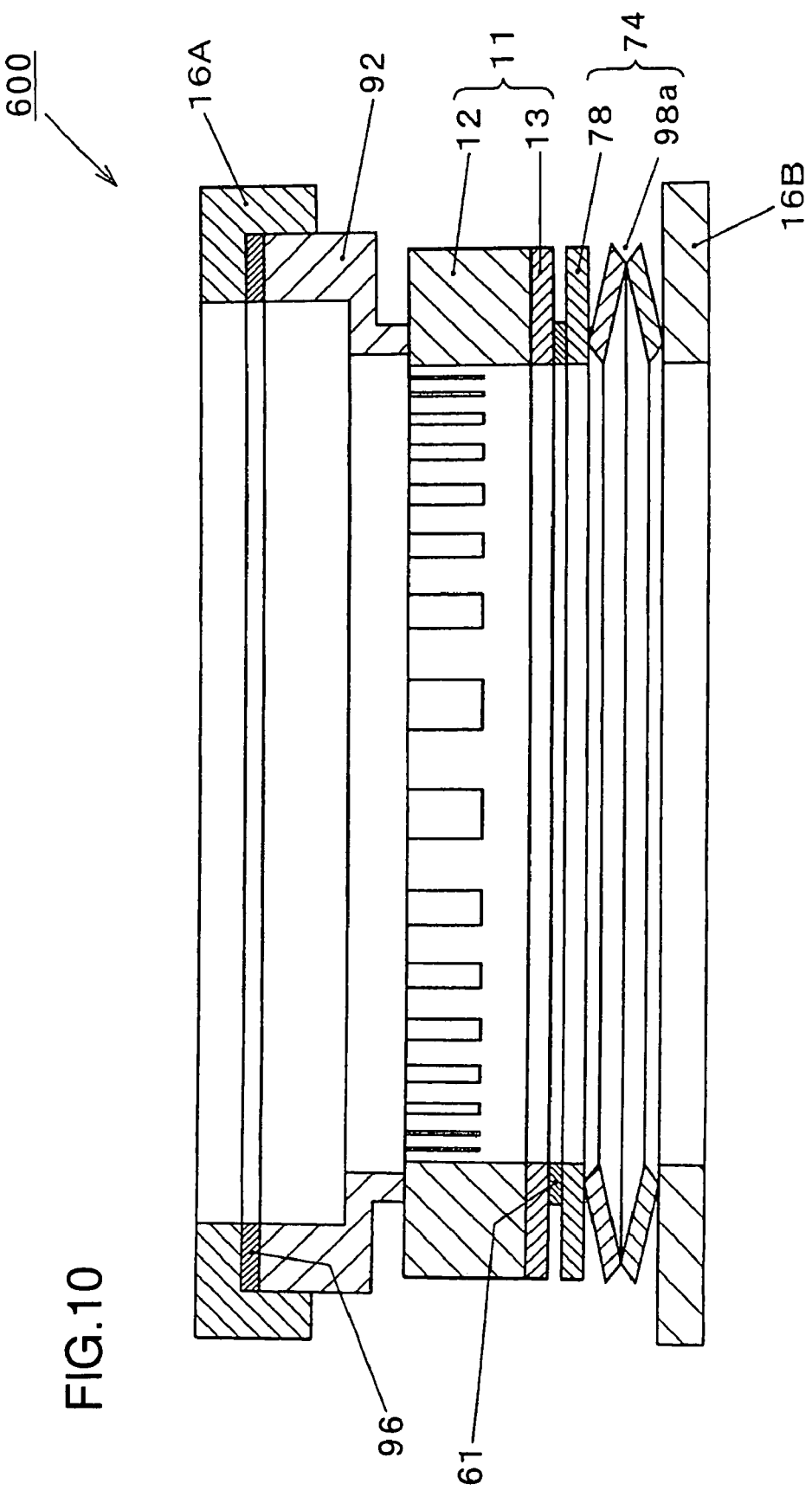
FIG. 10 is a sectional view schematically showing a vibrational actuator achieved in a seventh embodiment.

FIG. 10 is a schematic sectional view of a vibrational actuator achieved in the seventh embodiment of the present invention.

An ultrasonic motor 600 includes an oscillator 11, a moving body 92, a noise reducing member 96, supporting bodies 16A and 16B, a pressure applying portion 74 and the like.

An elastic body 12 of the oscillator 11 is a substantially annular member constituted of a ferroalloy such as stainless steel or an invar material. A piezoelectric body 13 is bonded onto one surface of the elastic body 12 via an electrically conductive adhesive or the like, whereas a tooth-comb portion (not shown) formed by cutting a plurality of grooves is disposed at the other surface.

The moving body 92 assuming a substantially annular shape is a relative motion member that is pressed in contact with the elastic body 12 by the pressure applying portion 74 to be detailed later and is frictionally-driven by the progressive wave-generated at the drive surface of the elastic body 12.

The noise reducing member 96, which is a substantially annular member constituted of EPDM (ethylene-propylene-diene-methylene linkage), i.e., a type of ethylene-propylene rubber, is disposed at a position sandwiched between the moving body 92 and the supporting body 16A along the direction in which the pressure is applied by the pressure applying portion 74 to be detailed later. The supporting body 16A is a relative motion member-side supporting member that supports the moving body 92. The supporting body 16A and the moving body 92 are engaged with each other via an engaging portion (not shown) so that the supporting body 16A and the moving body 92 rotate together as one. The supporting body 16A transmits the rotational motion of the moving body 92 to the driven member (not shown).

The pressure applying portion 74, which sets the oscillator 11 and the moving body 92 in contact with each other through pressure application, includes a pressure applying plate 78, a disc spring 98a and the like. The pressure applying plate 78 is a plate to which the pressure generated by the plate spring 98a is applied.

A buffer member 61, constituted of unwoven cloth or felt, blocks the vibration of the oscillator 11 so that the vibration is not transmitted to the pressure applying portion 74 and is disposed between the piezoelectric body 13 and the pressure applying plate 78.

The supporting body 16B is an oscillator-side supporting member that locks the ultrasonic motor 600 to, for instance, a lens barrel or the like of a camera.

Next, the noise reducing member 96 of the ultrasonic motor 600 achieved in the seventh embodiment is explained in further detail.

The elastic body 12 is constituted of stainless steel (SUS 304). The piezoelectric body 13 is bonded with epoxy adhesive to the surface of the elastic body 12 on the side opposite from its drive surface.

The moving body 92, on the other hand, is constituted of an Al alloy (A 6063) and an oxide film such as alumite is formed at the surface of the moving body through an anodizing process.

The noise reducing member 96, formed by punching a sheet material constituted of EPDM, has a glossy surface. The shore hardness of the noise reducing member 96 achieved in the seventh embodiment is equal to or less than 50, and the compressibility calculated by dividing the surface pressure applied to the noise reducing member 96 by the modulus of compressive elasticity is set within a range of 0.002~0.25.

In order to evaluate the noise reducing effect achieved in the seventh embodiment, a plurality of noise reducing member samples assuming substantially identical shapes to the shape of the noise reducing member 96 in the embodiment but constituted with varying materials and having varying shore hardness levels, compressibility levels and the like were prepared, ultrasonic motors similar to the ultrasonic motor 600 equipped with these noise reducing members were driven and the noise conditions during the drive were measured.

(Relationship Between Shore Hardness and Noise Generation)

FIG. 11 is a table presenting the results of measurements related to shore hardness and noise generation.

Noise reducing member samples 1 through 8 used in the measurement all assumed a substantially annular shape and had a thickness of 0.5 mm. Samples 1 through 6 were constituted of EPDM, achieving shore hardness levels of 10, 20, 30, 40, 50 and 60 respectively, whereas samples 7 and 8 constituted of IIR (butyl rubber) respectively achieved shore hardness levels of 40 and 60. As the ultrasonic motors were driven, the various samples were all subjected to a surface pressure of 0.4 MPa.

As indicated in FIG. 11, no abnormal noise occurred over the entire temperature range in the noise reducing member samples 1 through 5 achieving shore hardness levels equal to or lower than 50 were driven.

However, noise occurrence was observed in the tests conducted in a low-temperature environment on the noise reduction member sample 6 constituted of EPDM with its shore hardness set at 60 or over and on the noise reducing member samples 7 and 8 constituted of IIR and achieving shore hardness levels of 40 through 60.

The measurement results indicate that a noise reducing member 96 constituted of EPDM with its shore hardness equal to or less than 50, such as that achieved in the seventh embodiment, is effective in applications in which noise must be reduced in a low-temperature environment.

While it is known in the related art that noise may be reduced by utilizing a rubber vibration isolator to constitute part of the moving body, there are numerous different types of rubber material and there is a concern that unless the correct type of rubber is used, noise may actually increase.

For instance, if a rubber member constituted of butyl rubber, the physical characteristics of which tend to change readily as the temperature changes and the vibration absorbing performance of which deteriorates particularly in a low-temperature environment, is disposed between the moving body and the driven element, a serious noise problem can occur.

(Relationship Between Compressibility and Noise Generation)

FIG. 12 is a table presenting the results of measurement related to the compressibility and noise generation.

The noise reducing member sample used in this measurement was constituted of EPDM, and had a shore hardness of 40. Its modulus of 10% compressive elasticity was 3.0 MPa. The measurement was executed at room temperature and the compressibility was altered by adjusting the pressure applied from the disk spring 98a.

The measurement results presented in FIG. 12 indicate that noise can be effectively reduced by using a noise reducing member with its compressibility within a range of 0.002~0.25.

The results presented in FIGS. 11 and 12 indicate that the noise reducing member 96 should be constituted of EPDM, its shore hardness should be equal to or less than 50 and its compressibility is within the range of 0.002~0.25 to ensure that it can be effectively used to reduce noise in any operating environment.

In addition, as the extent of energy loss is reduced by reducing noise, the drive efficiency of the ultrasonic motor 600 is improved.

Furthermore, since EPDM is a lightweight material, the product itself can be provided as a lightweight unit.

We drove the ultrasonic motor 600 equipped with a noise reducing member 96 with a shore hardness of 40 and compressibility of 0.1 as a test. The results of the test confirmed that no abnormal noise occurred while the ultrasonic motor was being driven in a low-temperature environment in which noise tends to occur readily, demonstrating superior performance over vibrational motors in the related art.

Eighth Embodiment

Figure 13:
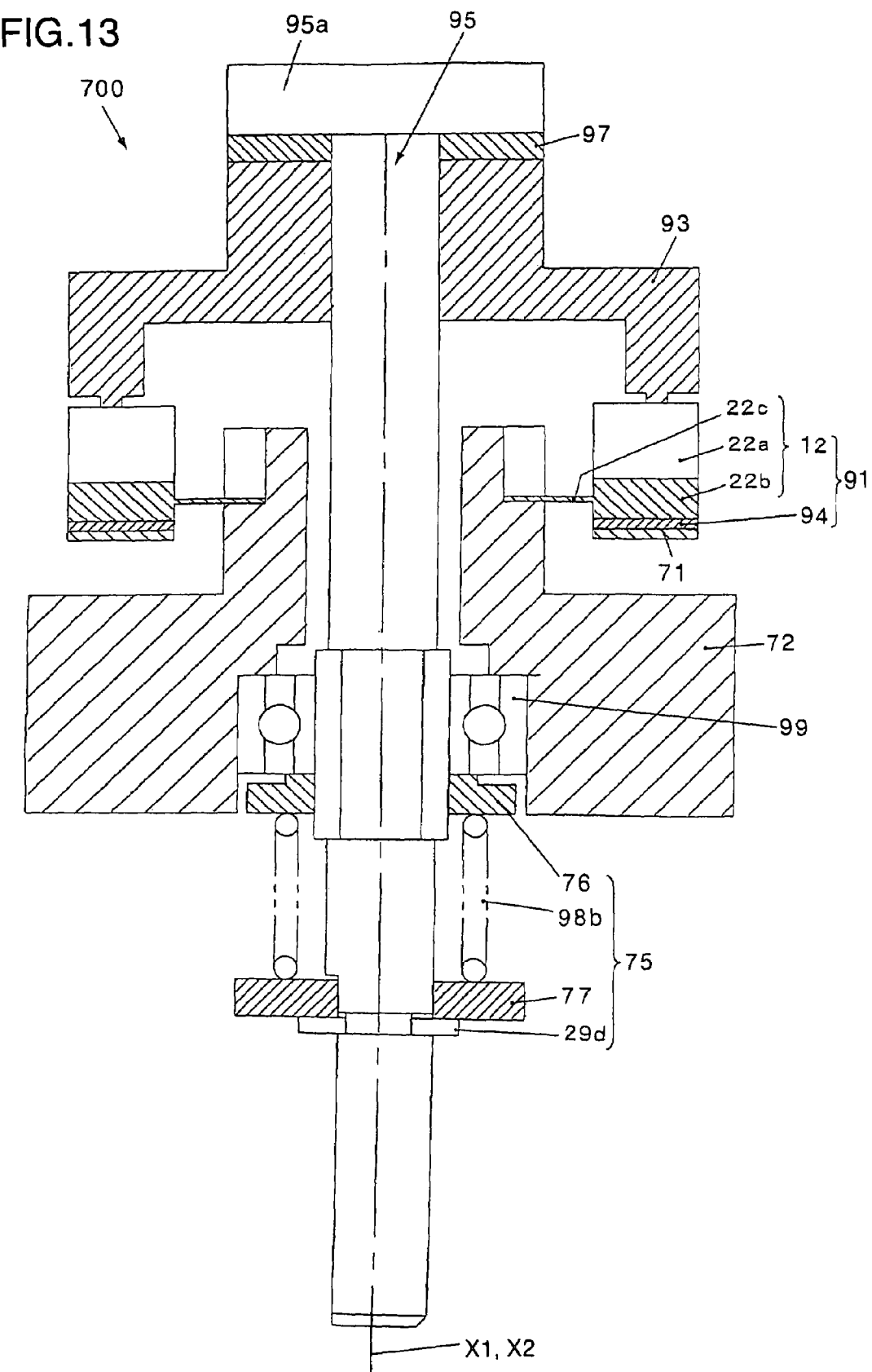
FIG. 13 is a sectional view schematically showing a vibrational actuator achieved in an eighth embodiment.

FIG. 13 is a schematic sectional view of an ultrasonic motor achieved in the eighth embodiment of the present invention.

An ultrasonic motor 700 achieved in the eighth embodiment includes an oscillator 91, a moving body 93, a fixed member 72, a bearing 99, an output shaft 95, a pressure applying portion 75 and the like.

The oscillator 91 is a substantially annular member that includes an elastic body 12, a piezoelectric body 94 bonded to the elastic body 12 and the like. As the piezoelectric body 94 expands and contracts, a progressive wave is generated at the oscillator 91.

The elastic body 12 constituted of a metal with a high level of resonance sharpness, such as stainless steel, assumes a substantially annular shape. The elastic body 12 includes a tooth-comb portion 22a having a plurality of comb teeth formed along the circumferential direction and a base portion 22b formed continuously along the circumferential direction. The front end surface of the tooth-comb portion 22a constitutes a drive surface that is pressed in contact with the moving body 93 to be detailed later.

At the elastic body 12, a flange portion 22c is disposed on the inner circumferential side of the base portion 22b and the elastic body 12 is supported and fixed at the fixed member 72 via the flange portion 22c.

The piezoelectric body 94 is an electromechanical conversion element such as a piezoelectric element or an electrostrictive element that converts electrical energy to mechanical energy. The piezoelectric body 94 includes ranges along the circumferential direction over which two phases (A-phase and B-phase) electrical signals are input. Over the range corresponding to either phase, elements with alternating polarities are disposed over half-wavelength intervals, with an interval corresponding to a quarter-wavelength formed between the A-phase and the B-phase.

In addition, the wiring of a flexible printed circuit board 71 is connected to electrodes with the individual phases at the piezoelectric body 94, and thus, the piezoelectric body 94 expands and contracts as a drive signal is provided from the outside to the flexible printed circuit board 71, thereby causing vibration of the elastic body 12.

The moving body 93 is a member that is pressed in contact with the drive surface of the elastic body 12, and the rotationally driven elliptical motion caused by the progressive wave generated at the drive surface. The moving body 93 is fitted with an output shaft 95 and is constituted of a light metals such as aluminum.

The output shaft 95, assuming a substantially cylindrical shape, includes a substantially disk-shaped flange portion 95*a* formed at one end thereof and is rotatably mounted at a fixed member 72 via a bearing 99. The output shaft 95 and the moving body 93, fitted with each other via a D-cut, rotate as one so that the rotational motion of the moving body 93 is transmitted by the output shaft 95 to the driven member (not shown).

In addition, the output shaft 95 regulates the position of the moving body 93 along the direction in which pressure is applied by a pressure applying portion 75 to the moving body 93 and the oscillator 91, and it also functions as a relative motion member-side supporting member that supports the moving body 93.

A noise reducing member 97, which is a substantially annular member disposed at a position enclosed between the flange portion 95*a* of the output shaft 95 and the moving body 93 along the direction in which the pressure is applied by the pressure applying portion 75 to be detailed later. As is the noise reducing member 96 achieved in the seventh embodiment, the noise reducing member 97 is formed by punching a sheet material constituted of EPDM having a glossy surface and a thickness of 0.5 mm. The shore hardness of the noise reducing member 97 is equal to or less than 50, and the compressibility is set within a range of 0.002~0.25.

The pressure applying portion 75 is a mechanism that applies pressure to the oscillator 91 and the moving body 93, and is disposed at the output shaft 95. The pressure applying portion 75 includes a disk spring 98*b* that generates the pressure to be applied, a retaining ring 76 that is disposed in contact with the bearing 99 and holds one end of the disk spring 98*b*, a retaining ring 77 that holds the other end of the plate spring 98*b* and an E-ring 29*d* inserted in a groove formed at the output shaft 95 to regulate the position of the retaining ring 77.

By equipping the ultrasonic motor 700 achieved in the eighth embodiment with the noise reducing member 97, noise is reduced and ultimately, the drive efficiency of the ultrasonic motor 700 is improved as in the seventh embodiment.

(Examples of Variations)

The present invention is not limited to the seventh and eighth embodiments explained above and allows for numerous variations and modifications which are equally considered to be within the scope of the present invention.

(1) The noise reducing member 96 achieved in the seventh embodiment is disposed at a position sandwiched between the moving body 92 and the supporting body 16A along the direction in which pressure is applied from the pressure applying portion 74. However, the present invention is not limited to this example and such a noise reducing member may be disposed at a position (the position of the buffer member 61) sandwiched between the oscillator 11 and the supporting body 16B along the direction in which pressure is applied from the pressure applying portion 74, for instance.

In addition, the noise reducing member may be disposed at two locations, i.e., at the position sandwiched between the moving body 92 and the supporting body 16A along the direction in which pressure is applied by the pressure applying portion 74 and at the position sandwiched between the oscillator 11 and the supporting body 16B along the direction in which pressure is applied by the pressure applying portion 74.

(2) The noise reducing member 97 achieved in the eighth embodiment is disposed between the moving body 93 and the flange portion 95*a* of the output shaft 95. However, the present invention is not limited to this example and the noise reducing member 97 may be disposed between, for instance, the fixed member 72 and the oscillator 91 (the flexible printed circuit board 71).

(3) The noise reducing members 96 and 97 achieved in the seventh and eighth embodiments are both formed by punching and have glossy surfaces. However, the present invention is not limited to this example and a noise reducing member formed through another method such as injection molding may be used. In addition, no specific limitations are imposed with regard to the surface finish of the noise reducing members 96 and 97 and they may have matte surfaces instead.

(4) The noise reducing members 96 and 97 achieved in the seventh and eighth embodiments are constituted of EPDM only. However, the present invention is not limited to this example and a noise reducing member that includes film, an adhesive or the like bonded onto EPDM may be used.

(5) While the noise reducing members 96 and 97 achieved in the seventh and eighth embodiments are both adopted in rotary ultrasonic motors 600 and 700, the present invention is not limited to this example and a noise reducing member according to the present invention may be used in a linear vibrational wave motor, as well.

(6) The noise reducing members 96 and 97 achieved in the seventh and eighth embodiments are mounted in ultrasonic motors 600 and 700 that respectively drive the moving bodies 92 and 93 with progressive vibrational ways. However, the present invention is not limited to this example and either the noise reducing member 96 or the noise reducing member 97 may be utilized in a vibrational wave motor that drives a moving body through vibration of a torsional oscillator.

(7) While the noise reducing members 96 and 97 achieved in the seventh and eighth embodiments are both adopted in ultrasonic motors 600 and 700, the present invention is not limited to this example and a noise reducing member according to the present invention may be used in a vibrational wave motor that does not use vibration in the ultrasonic range.

A wavy washer is also available instead of the plate spring 98B.

The above described embodiments are examples and various modifications can be made without departing from the scope of the invention.

What is claimed is:

1. A vibrational actuator, comprising:
an oscillator that generates vibrational energy;
a mover that is rotationally driven around a first axis by the vibrational energy;
an output shaft that rotates around a second axis by a rotational drive of the mover;

a flange portion that disposes the mover between the oscillator and the flange portion, rotates together with the output shaft, and is movable relative to the output shaft;
a regulating member that regulates a position of the flange portion relative to the output shaft;
the output shaft is capable of titling relative to the mover within a predetermined range in angle formed by the first axis and the second axis;
a distance from the first axis to an outer border of an area where the mover is pressed against the flange portion is set to a value large enough to prevent the first axis and the second axis from becoming tilted relative to each other; and
the regulating member comprises a retaining ring fitted inside a groove formed at the output shaft.

2. A vibrational actuator according to claim 1, wherein:
when r represents the distance from the first axis to the outer portion of the mover over the area where the mover is pressed against the flange portion and R represents a distance from the first axis to an outer portion of the mover over an area where the mover is pressed against the oscillator, a relationship expressed as $r/R \geq 0.5$ is satisfied.

3. A vibrational actuator according to claim 1, wherein:
the mover includes a through hole in which the output shaft is at least partially fitted.

4. A vibrational actuator according to claim 3, wherein:
the output shaft comprises a fitting portion that fits with part of an inner wall of the through hole and a recess portion assuming external dimensions small enough to ensure that the recess portion does not come into contact with the inner wall of the through hole.

5. A vibrational actuator according to claim 4, wherein:
the fitting portion is formed between the flange portion and the recess portion and fits with the part of the inner wall of the through hole toward the flange portion.

6. A vibrational actuator according to claim 1, wherein:
the oscillator comprises a piezoelectric body excited by a drive signal and an elastic body bonded to the piezoelectric body, that generates the vibrational energy at a drive surface as the piezoelectric body becomes excited.

7. A vibrational actuator according to claim 1, further comprising:
a pressure applying member that presses the oscillator in contact with the mover, wherein:
the pressure applying member is disposed in close proximity to an outer circumferential surface of the output shaft on a side of the oscillator opposite from a side where the mover is disposed, applies a pressure to the mover at a position between the flange portion and the oscillator, and rotates together with the output shaft.

8. A vibrational actuator according to claim 7, further comprising:
a fixed member that locks the oscillator;
an output transmitting member that rotates together with the output shaft and transmits a drive force to a driven member; and
a bearing portion disposed between the flange portion and the output transmitting member, that determines a position of the output shaft along a radius of a rotational motion of the output shaft relative to the fixed member and is subjected to the pressure applied by the pressure applying member, wherein:
the pressure applying member is disposed between the bearing portion and the output transmitting member.

9. A vibrational actuator according to claim 1, further comprising:
a noise reducing member disposed at a position sandwiched between the mover and the flange portion.

10. A vibrational actuator according to claim 9, wherein:
the noise reducing member is constituted with a material containing ethylene-propylene rubber.

11. A vibrational actuator according to claim 10, wherein:
the ethylene-propylene rubber is EPDM (ethylene-propylene-diene-methylene linkage).

12. A vibrational actuator according to claim 9, wherein:
shore hardness of the noise reducing member is equal to or less than 50.

13. A vibrational actuator according to claim 9, wherein:
compressibility calculated for the noise reducing member by dividing a surface pressure applied to the noise reducing member by a modulus of compressive elasticity is within a range of 0.002~0.25.

14. A method for driving a vibrational actuator, comprising:
rotationally driving a mover around a first axis with vibrational energy generated at an oscillator;
applying pressure to a mover between a flange portion and the oscillator;
determining a position of the flange portion relative to an output shaft by using a regulating member having a retaining ring fitted inside a groove formed at the output shaft;
rotating the output shaft around a second axis by using a rotational force of the mover;
assuring a level of freedom that allows the output shaft capable of tilting relative to the mover within a predetermined range in angle formed by the first axis and the second axis; and
driving the mover so as to prevent the first axis and the second axis from becoming tilted relative to each other by using an outer border of an area where the mover is pressed against the flange portion.

15. A method for driving a vibrational actuator according to claim 14, wherein:
when r represents a distance from the first axis to the outer portion of the mover over the area where the mover is pressed against the flange portion and R represents a distance from the first axis to an outer portion of the mover over an area where the mover is pressed against the oscillator, a relationship expressed as $r/R \geq 0.5$ is satisfied.

16. A method for driving a vibrational actuator according to claim 14, wherein:
the flange portion is capable of moving relative to the output shaft.

17. A method for driving a vibrational actuator according to claim 14, wherein:
a noise reducing member is disposed at a position sandwiched between the mover and the flange portion.

18. A vibrational actuator, comprising:
an oscillator that generates vibrational energy;
a mover that is rotationally driven around a first axis by the vibrational energy and fixed to a fixed member;
an output shaft that rotates around a second axis by a rotational drive of the mover;
a flange portion that disposes the mover between the oscillator and the flange portion, rotates together with the output shaft, and is movable relative to the output shaft;
a regulating member that regulates a position of the flange portion relative to the output shaft; and
the output shaft is capable of tilting relative to the mover around the fixed member within a predetermined range in angle formed by the first axis and the second axis; and the regulating member is a retaining ring fitted inside a groove formed at the output shaft.

19. A vibrational actuator according to claim 18, wherein the number of the fixed member is one.

20. A vibrational actuator according to claim 18, further comprising:
a bearing disposed between the fixed member and the output shaft.

21. A vibrational actuator according to claim 20, further comprising:
a receptive member disposed between the bearing and the output shaft.

22. A vibrational actuator according to claim 18, wherein:
when r represents the distance from the first axis to the outer portion of the mover over the area where the mover is pressed against the flange portion and R represents a distance from the first axis to an outer portion of the mover over an area where the mover is pressed against the oscillator, a relationship expressed as $r/R \geqq 0.5$ is satisfied.

23. A vibrational actuator according to claim 18, wherein:
the flange portion is capable of moving relative to the output shaft.

24. A vibrational actuator according to claim 18, wherein:
the mover includes a through hole in which the output shaft is at least partially fitted.

25. A vibrational actuator according to claim 24, wherein:
the output shaft comprises a fitting portion that fits with part of an inner wall of the through hole and a recess portion assuming external dimensions small enough to ensure that the recess portion does not come into contact with the inner wall of the through hole.

26. A vibrational actuator according to claim 25, wherein:
the fitting portion is formed between the flange portion and the recess portion and fits with the part of the inner wall of the through hole toward the flange portion.

27. A vibrational actuator according to claim 18, wherein:
the oscillator comprises a piezoelectric body excited by a drive signal and an elastic body bonded to the piezoelectric body, that generates the vibrational energy at a drive surface as the piezoelectric body becomes excited.

28. A vibrational actuator according to claim 18, further comprising:
a pressure applying member that presses the oscillator in contact with the mover, wherein:
the pressure applying member is disposed in close proximity to an outer circumferential surface of the output shaft on a side of the oscillator opposite from a side where the mover is disposed, applies a pressure to the mover at a position between the flange portion and the oscillator, and rotates together with the output shaft.

29. A vibrational actuator, comprising:
an oscillator that generates vibrational energy;
a mover that is rotationally driven around a first axis by the vibrational energy;
an output shaft that rotates around a second axis by a rotationally drive of the mover;
a flange portion that rotates together with the output shaft, and is movable relative to the output shaft;
a pressure applying member that applies a pressure to the mover at a position between the oscillator and the flange portion;
the output shaft is capable of tilting relative to the mover within a predetermined range in angle formed by the first axis and the second axis;

the first axis and the second axis are almost coaxially-arranged during the pressure is applied; and
the pressure applying member includes a compression coil spring disposed nearly along the second axis.

30. A vibrational actuator according to claim 29, wherein:
the pressure applying member is disposed in close proximity to an outer circumferential surface of the output shaft on a side of the oscillator opposite from a side where the mover is disposed, and rotates together with the output shaft.

31. A vibrational actuator according to claim 29, further comprising:
a regulating member that regulates a position of the flange portion relative to the output shaft, wherein:
the output shaft is capable of tilting relative to and the mover around the regulating member.

32. A vibrational actuator according to claim 30, further comprising:
a fixed member that locks the oscillator;
an output transmitting member that rotates together with the output shaft and transmits a drive force to a driven member; and
a bearing portion disposed between the flange portion and the output transmitting member, that determines a position of the output shaft along a radius of a rotational motion of the output shaft relative to the fixed member and is subjected to the pressure applied by the pressure applying member, wherein:
the pressure applying member is disposed between the bearing portion and the output transmitting member.

33. A vibrational actuator according to claim 31, wherein:
the output transmitting member and the output shaft are relatively fixed.

34. A vibrational actuator according to claim 29, further comprising:
a noise reducing member disposed at a position sandwiched between the mover and the flange portion.

35. A vibrational actuator according to claim 33, wherein:
the noise reducing member is constituted with a material containing ethylene-propylene rubber.

36. A vibrational actuator according to claim 34, wherein:
the ethylene-propylene rubber is EPDM (ethylene-propylene-diene-methylene linkage).

37. A vibrational actuator according to claim 33, wherein:
shore hardness of the noise reducing member is equal to or less than 50.

38. A vibrational actuator according to claim 33, wherein:
compressibility calculated for the noise reducing member by dividing a surface pressure applied to the noise reducing member by a modulus of compressive elasticity is within a range of 0.002 -0.25.

39. A vibrational actuator according to claim 1, wherein:
the flange portion is disposed between the mover and the retaining ring.

40. A method for driving a vibrational actuator according to claim 14, wherein:
disposing the flange portion between the mover and the retaining ring.

41. A vibrational actuator according to claim 18, wherein:
the flange portion is disposed between the mover and the retaining ring.

42. A vibrational actuator according to claim 31, wherein:
the flange portion is disposed between the mover and the retaining ring.

* * * * *